(12) United States Patent
Komatsu et al.

(10) Patent No.: US 7,864,405 B2
(45) Date of Patent: Jan. 4, 2011

(54) ELECTROPHORETIC DISPLAY SHEET, ELECTROPHORETIC DISPLAY DEVICE AND ELECTRONIC APPARATUS

(75) Inventors: Harunobu Komatsu, Matsumoto (JP); Hitoshi Yamamoto, Chino (JP); Mitsuo Kushino, Suita (JP); Tomoyuki Kuwamoto, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 94 days.

(21) Appl. No.: 12/289,513

(22) Filed: Oct. 29, 2008

(65) Prior Publication Data

US 2009/0109521 A1 Apr. 30, 2009

(30) Foreign Application Priority Data

Oct. 30, 2007 (JP) .............................. 2007-282281

(51) Int. Cl.
G02B 26/00 (2006.01)
(52) U.S. Cl. ........................................ 359/296; 345/107
(58) Field of Classification Search ................. 359/296; 345/107
See application file for complete search history.

(56) References Cited

U.S. PATENT DOCUMENTS 6,844,958 B2 * 1/2005 Kawai ........................ 359/296
7,193,770 B2 3/2007 Kanbe
7,414,776 B2 8/2008 Liu et al.
7,557,984 B2 7/2009 Karasawa et al.
2004/0027642 A1 * 2/2004 Ahn et al. ................... 359/296

FOREIGN PATENT DOCUMENTS

| JP | A-2007-11342 | 1/2007 |
| JP | A-2007-58151 | 3/2007 |
| JP | A-2007-233178 | 9/2007 |
| JP | A-2008-268734 | 11/2008 |

* cited by examiner

*Primary Examiner*—Evelyn A. Lester
(74) *Attorney, Agent, or Firm*—Oliff & Berridge, PLC

(57) ABSTRACT

An electrophoretic display sheet capable of increasing pressure resistance and bleed resistance of microcapsules and constructing an electrophoretic display device stably operable for a long period of time, a highly reliable electrophoretic display device and a highly reliable electronic apparatus are provided. The electrophoretic display sheet includes a base substrate having one major surface, and a microcapsule-containing layer provided on the side of the one major surface of the base substrate and having one major surface, the microcapsule-containing layer including a plurality of microcapsules, each of the microcapsules having a shell and an electrophoretic dispersion liquid containing at least one kind of electrophoretic particles and encapsulated into the shell, wherein the microcapsules exist in a generally spherical shape within the microcapsule-containing layer.

14 Claims, 9 Drawing Sheets

Micrograph subjected to gray scale conversion

Micrograph subjected to image processing

ELECTROPHORETIC DISPLAY SHEET, ELECTROPHORETIC DISPLAY DEVICE AND ELECTRONIC APPARATUS

CROSS-REFERENCE TO RELATED APPLICATION

This application claims a priority to Japanese Patent Application No. 2007-282281 filed on Oct. 30, 2007 which is hereby expressly incorporated by reference herein in its entirety.

BACKGROUND

1. Technical Field

The present invention relates to an electrophoretic display sheet, an electrophoretic display device and an electronic apparatus, and more specially relates to an electrophoretic display sheet, an electrophoretic display device provided with the electrophoretic display sheet and an electronic apparatus provided with the electrophoretic display device.

2. Related Art

It is generally known that, if electric fields are allowed to act on a dispersion system in which fine particles are dispersed in liquid, the fine particles move (or migrate) in the liquid by the Coulomb force. This phenomenon is referred to as electrophoresis. In recent years, an electrophoretic display device that displays desired information (images) using the electrophoresis draws attention as a new display device.

The electrophoretic display device is characterized by exhibiting display memory characteristics and broad viewing angle characteristics even at the time of stoppage of voltage application and by possessing a capability of performing high contrast display with reduced electricity consumption.

The electrophoretic display device is a reflection type display that uses natural light as a light source. In order to realize high visibility, the electrophoretic display device is required to employ a transmission part of high transparency, a reflection part of high reflectance and an absorption part of high absorbency.

As a conventional electrophoretic display device, JP-A-2007-58151 discloses an electrophoretic display device manufactured by forming a microcapsule-containing layer containing a plurality of microcapsules and a binder on a first substrate, placing a second substrate on the microcapsule-containing layer and then applying heat and pressure thereto from above and below to bond the first substrate, the second substrate and the microcapsule-containing layer together.

In this regard, the microcapsules are produced by encapsulating an electrophoretic dispersion liquid, in which electrophoretic particles are dispersed, into a wall material (shell). Conventionally, a relatively flexible material, e.g., a composite material of gum arabic and gelatin, is frequently used as a constituent material of the shell.

In the case where the shell is composed of the flexible material, the microcapsules are compressed and deformed upon heating and pressurizing the microcapsule-containing layer. Therefore, the microcapsule-containing layer thus formed has a structure in which the respective microcapsules are crushed in an up-and-down direction (namely, a stone-wall structure).

In general, the flexible material is low in density. For this reason, if the shell is made of only the flexible material, the microcapsules suffer from insufficiency in pressure resistance (that is, a property with which the microcapsules resist the pressure applied thereto without being crushed) and in bleed resistance (that is, a property with which the dispersion liquid encapsulated into the microcapsules is kept against dissipation).

Consequently, it is highly likely that the microcapsules are damaged or the electrophoretic dispersion liquid is leaked out due to pressure applied when bonding the microcapsule-containing layer and the substrates together or due to an impact and a pressing force applied while the microcapsules are used and stored as a display device. This makes it difficult to stably operate the electrophoretic display device for a long period of time.

SUMMARY

It is several aspects of the present invention to provide an electrophoretic display sheet capable of increasing pressure resistance and bleed resistance of microcapsules and constructing an electrophoretic display device stably operable for a long period of time, a highly reliable electrophoretic display device and a highly reliable electronic apparatus.

In a first aspect of the present invention, there is provided an electrophoretic display sheet. The electrophoretic display sheet comprises a base substrate having one major surface, and a microcapsule-containing layer provided on the side of the one major surface of the base substrate and having one major surface, the microcapsule-containing layer including a plurality of microcapsules, each of the microcapsules having a shell and an electrophoretic dispersion liquid containing at least one kind of electrophoretic particles and encapsulated into the shell, wherein the microcapsules exist in a generally spherical shape within the microcapsule-containing layer.

According to the electrophoretic display sheet, even in the case where a circuit board is bonded thereto, the microcapsules can maintain the spherical shape within the microcapsule-containing layer. As a result, it is possible to increase pressure resistance and bleed resistance of the microcapsules. Therefore, use of the electrophoretic display sheet makes it possible to construct an electrophoretic display device stably operable for a long period of time.

In the electrophoretic display sheet according to the present invention, it is preferred that in the case where in a plan view of the microcapsule-containing layer as seen from the side of the one major surface thereof, the number of microcapsules having a Heywood circularity factor of 1.40 or less is defined as $N_{1.40}$ and the number of microcapsules having the Heywood circularity factor of 1.08 or less is defined as $N_{1.08}$, a spherical particle ratio calculated by the following equation, that is, spherical particle ratio (%)= $(N_{1.08}/N_{1.40}) \times 100$, is equal to or greater than 60%.

In the case of satisfying such a relation, the microcapsule-containing layer contains, in a large quantity, microcapsules having high sphericity, i.e., microcapsules superior in the pressure resistance and the bleed resistance. This makes it possible to provide an electrophoretic display sheet capable of constructing an electrophoretic display device stably operable for a long period of time.

In the electrophoretic display sheet according to the present invention, it is preferred that in a cross section taken along a direction orthogonal to the one major surface of the microcapsule-containing layer, the Heywood circularity factor of the microcapsules is in the range of 1.00 to 1.10.

The microcapsules with the average value of the Heywood circularity factors in the cross section falling within the range noted just above can be evaluated to have increased sphericity and superior pressure resistance and bleed resistance.

In the electrophoretic display sheet according to the present invention, it is preferred that the shell of each of the microcapsules includes a spherical first layer and a spherical second layer arranged outside the first layer.

This makes it possible to synergistically impart characteristics of the first and second layers to the shell.

In the electrophoretic display sheet according to the present invention, it is preferred that the second layer has higher elasticity than that of the first layer.

By employing such construction, the second layer becomes more abundant in elasticity than the first layer, and the first layer grows more abundant in rigidity than the second layer. This allows the first layer to serve as a shape-keeping layer for keeping the shape of the microcapsules and allows the second layer to serve as a deformation-absorbing layer for absorbing a change in a shape of the electrophoretic dispersion liquid defined by the shell (the first layer).

In the electrophoretic display sheet according to the present invention, it is preferred that a constituent material of the first layer contains melamine-based resin as a major component thereof.

Since the melamine-based resin can form a three-dimensional network structure, the first layer made of such resin is superior in rigidity. As a result, the first layer serves as the shape-keeping layer in a preferred manner, thereby increasing the strength and the bleed resistance of the shell. This makes it possible to reliably form the microcapsules into the afore-mentioned spherical shape.

In the electrophoretic display sheet according to the present invention, it is preferred that a constituent material of the second layer contains epoxy-based resin as a major component thereof.

This ensures that the second layer has a suitable degree of the rigidity and the elasticity in combination. As a result, the second layer can reliably exhibit a function of the deformation-absorbing layer.

In the electrophoretic display sheet according to the present invention, it is preferred that the first layer and the second layer are chemically bonded together in their interfacial surfaces.

This makes it possible to reliably prevent occurrence of any separation of the first layer and the second layer.

In the electrophoretic display sheet according to the present invention, it is preferred that the microcapsules are formed so as to have the same size.

This ensures that the microcapsules are arranged uniformly. Therefore, in the case where the electrophoretic display sheet is used in an electrophoretic display device, occurrence of display variance therein is prevented or reduced. As a result, the electrophoretic display device is capable of exercising superior display performance.

In the electrophoretic display sheet according to the present invention, it is preferred that the at least one kind of the electrophoretic particles included in the microcapsules contain white particles and colored particles differing in color tone from the white particles.

This makes it possible to perform display having two or more colors in the electrophoretic display device in which the electrophoretic display sheet is used.

In the electrophoretic display sheet according to the present invention, it is preferred that the microcapsule-containing layer further includes a plurality of sub-microcapsules, each of the sub-microcapsules having a shell and an electrophoretic dispersion liquid containing at least one kind of electrophoretic particles and encapsulated into the shell, the sub-microcapsules having higher flexibility and smaller size than those of the microcapsules, wherein each of the microcapsules has a size corresponding to a full thickness of the microcapsule-containing layer, the microcapsules are arranged so as to form a single layer, and the sub-microcapsules are arranged so as to fill gaps formed between the microcapsules within the microcapsule-containing layer.

This makes it possible to perform uniform display in the electrophoretic display device in which the electrophoretic display sheet is used. As a result, it is possible to improve a display contrast thereof.

In the electrophoretic display sheet according to the present invention, it is preferred that the at least one kind of the electrophoretic particles included in the sub-microcapsules contain white particles and colored particles differing in color tone from the white particles.

This makes it possible to perform display having two or more colors in the electrophoretic display device in which the electrophoretic display sheet is used.

In a second aspect of the present invention, there is provided an electrophoretic display device. The electrophoretic display device comprises a base substrate having one major surface, a microcapsule-containing layer provided on the side of the one major surface of the base substrate, the microcapsule-containing layer including a plurality of microcapsules, each of the microcapsules having a shell and an electrophoretic dispersion liquid containing at least one kind of electrophoretic particles and encapsulated into the shell, and an opposite substrate provided on the opposite side of the microcapsule-containing layer from the base substrate, wherein the microcapsules exist in a generally spherical shape within the microcapsule-containing layer.

This makes it possible to provide an electrophoretic display device capable of increasing pressure resistance and bleed resistance of microcapsules and constructing an electrophoretic display device stably operable for a long period of time.

It is preferred that the electrophoretic display device further comprises an adhesive agent layer that bonds the microcapsule-containing layer and the opposite substrate together.

This makes it possible to fix the base substrate with the microcapsule-containing layer and the opposite substrate together through the adhesive agent layer. As a result, it is possible to improve stability and quality of the electrophoretic display device.

In a third aspect of the present invention, there is provided an electronic apparatus provided with the above electrophoretic display device.

This makes it possible to provide an electronic apparatus with high reliability.

DESCRIPTION OF EXEMPLARY EMBODIMENTS

Hereinafter, an electrophoretic display sheet, an electrophoretic display device and an electronic apparatus in accordance with the present invention will be described in detail with reference to preferred embodiments shown in the accompanying drawings.

First Embodiment

1 Electrophretic Display Device

First, description will be made on an electrophoretic display device (the electrophoretic display device according to the present invention) in which the electrophoretic display sheet of the present invention is used.

Figure 1:
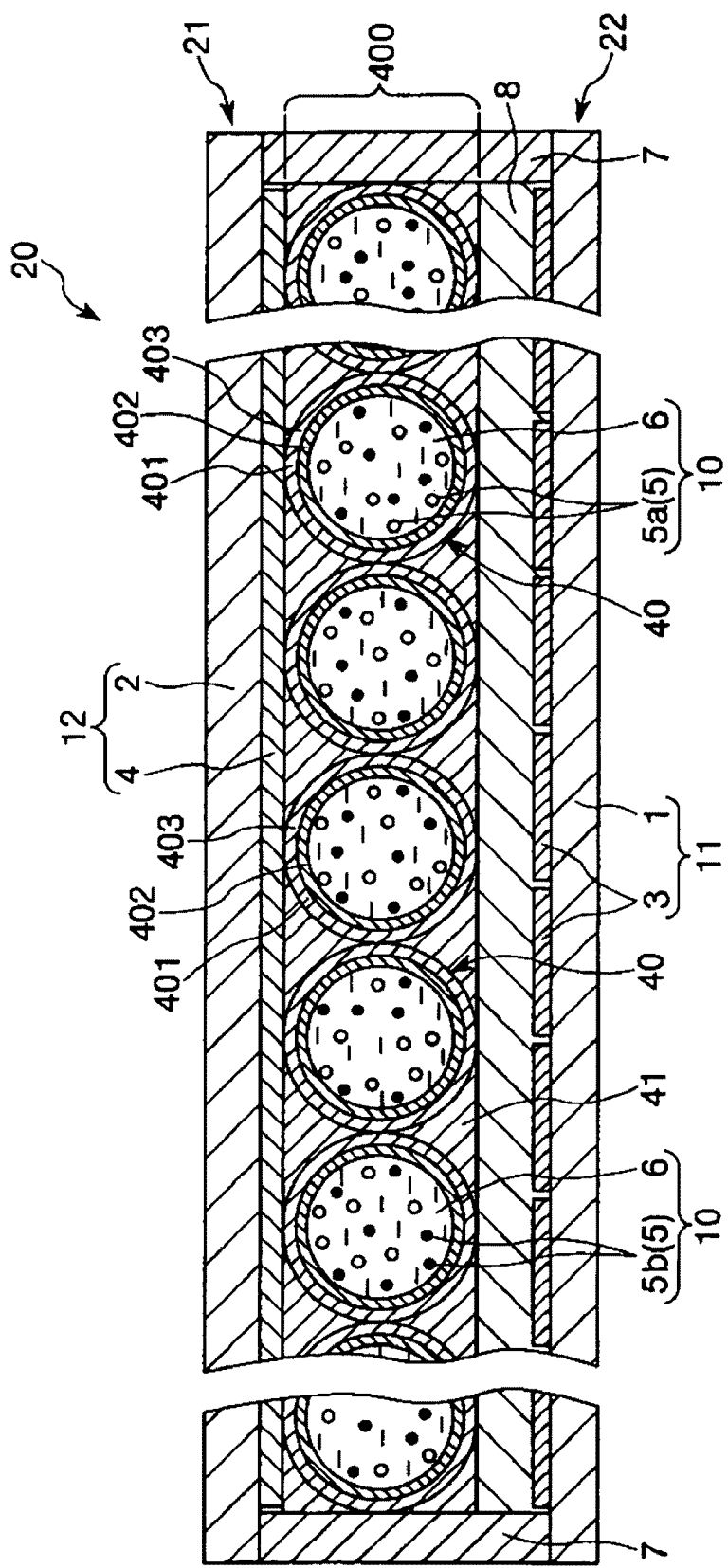
FIG. 1 is a pattern diagram showing a vertical section of a first embodiment of the electrophoretic display device according to the present invention.

FIG. 1 is a pattern diagram showing a vertical section of a first embodiment of the electrophoretic display device according to the present invention. Hereinafter, the upper side in FIG. 1 will be referred to as "upper" and the lower side will be referred to as "lower" for the purpose of convenience in description.

The electrophoretic display device 20 shown in FIG. 1 includes an electrophoretic display sheet (a front plane) 21, a circuit board (a back plane) 22, an adhesive agent layer 8 for bonding the electrophoretic display sheet 21 and the circuit board 22 together, and a sealing part 7 for air-tightly sealing a gap between the electrophoretic display sheet 21 and the circuit board 22.

The electrophoretic display sheet 21 includes a base substrate 12, which has a plate-like base portion 2 and a second electrode 4 formed on a lower surface of the base portion 2, and a microcapsule-containing layer 400 arranged on a lower surface (one major surface) of the base substrate 12 (the second electrode 4) and comprised of a plurality of microcapsules 40 and a binder 41.

On the other hand, the circuit board 22 includes an opposite substrate 11, which has a plate-like base portion 1 and a plurality of first electrodes 3 formed on an upper surface of the base portion 1, and circuits (not shown) provided in the opposite substrate 11 (on the base portion 1), the circuits including switching elements such as TFTs and the like.

A construction of the respective parts will be now described one after another.

The base portions 1 and 2 are formed from a sheet-like (plate-like) member and have a function of supporting or protecting the respective members arranged therebetween.

Although the base portions 1 and 2 may be either flexible or rigid, it is preferred that the base portions 1 and 2 have flexibility. Use of the base portions 1 and 2 having flexibility makes it possible to provide a flexible electrophoretic display device 20, namely, an electrophoretic display device 20 useful in constructing, e.g., an electronic paper.

In the case where the base portions 1 and 2 are flexible, examples of a constituent material thereof include polyolefin such as polyethylene, modified polyolefin, polyamide, thermoplastic polyimide, polyether, polyether ether ketone, various kinds of thermoplastic elastomers such as polyurethane-based elastomer and chlorinated polyethylene-based elastomer, copolymers mainly constituted of the above materials, blends mainly constituted of the above materials, polymer alloys mainly constituted of the above materials, and the like. One or more of these materials may be used independently or in combination.

An average thickness of each of the base portions 1 and 2 is not particularly limited to a specific value, but may be arbitrarily set depending on the constituent material and use thereof.

In the case where the base portions 1 and 2 are flexible, the average thickness of each of the base portions 1 and 2 is preferably in the range of about 20 to 500 μm, and more preferably in the range of about 25 to 250 μm. This makes it possible to reduce the size (especially, the thickness) of the electrophoretic display device 20, while harmonizing flexibility and strength of the electrophoretic display device 20.

The first electrodes 3 and the second electrode 4 are of a layered shape (film shape) and are respectively formed on major surfaces of the base portions 1 and 2 on the sides of the microcapsule-containing layer 400. In other words, the first electrodes 3 are formed on an upper surface of the base portion 1 and the second electrode 4 is formed on a lower surface of the base portion 2.

If a voltage is applied to between the first electrodes 3 and the second electrode 4, electric fields are generated across them so that the electric fields act on electrophoretic particles (display particles) 5.

In this embodiment, the second electrode 4 serves as a common electrode and the first electrodes 3 function as individual electrodes divided in a form of a matrix (pixel electrodes connected to the switching elements). A portion where the second electrode 4 is overlapped with one of the first electrodes 3 constitutes a unit pixel.

Just like the first electrodes 3, the second electrode 4 may be divided into a plurality of electrodes. Furthermore, the first electrodes 3 may be divided into a plurality of stripe-shaped electrodes and, similarly, the second electrode 4 may be divided into a plurality of stripe-shaped electrodes. In this case, the first electrodes 3 and the second electrode 4 may be arranged to intersect with each other.

A constituent material of each of the first electrodes 3 and the second electrode 4 is not particularly limited to a specific type as long as it is substantially conductive. Various kinds of conductive materials may be used as the constituent material of each of the first electrodes 3 and the second electrode 4.

Examples of such a conductive material include: a metallic material such as copper, aluminum or alloy containing these metals; a carbon-based material such as carbon black; an electronically conductive polymer material such as polyacetylene, polyfluorene or derivatives thereof; an ion-conductive polymer material produced by dispersing an ionic substance such as NaCl or $Cu(CF_3SO_3)_2$ in a matrix resin such as polyvinyl alcohol or polycarbonate; and a conductive oxide material such as indium oxide (IO); and the like. One or more of these materials may be used independently or in combination.

An average thickness of each of the first electrodes 3 and the second electrode 4 is not particularly limited to a specific value, but may be arbitrarily set depending on the constituent material and use thereof. The average thickness of each of the first electrodes 3 and the second electrode 4 is preferably in the range of about 0.05 to 10 μm, and more preferably in the range of about 0.05 to 5 μm.

Among the base portions 1 and 2 and the first electrodes 3 and the second electrode 4, the ones arranged on a display surface side (the base portion 2 and the second electrode 4 in this embodiment) are optically transparent, i.e., substantially transparent (clear and colorless, clear and colorful, or translucent).

This makes it possible to easily recognize, through visual observation, a status of the electrophoretic particles 5 in the electrophoretic dispersion liquid 10 described below, i.e., information (images) displayed by the electrophoretic display device 20.

In the electrophoretic display sheet 21, the microcapsule-containing layer 400 is provided in contact with the lower surface of the second electrode 4. The microcapsule-containing layer 400 includes a plurality of microcapsules 40 and a binder 41 for fixing (or holding) the microcapsules 40 in position, each of the microcapsules 40 having a capsule body (shell) 401 filled with (encapsulating) the electrophoretic dispersion liquid 10.

Hereinafter, the microcapsule-containing layer 400 will be described, but the microcapsules 40 will be described below in detail.

The electrophoretic dispersion liquid 10 encapsulated within the capsule body 401 is produced by dispersing (or suspending) at least one kind of electrophoretic particles 5 (two kinds of electrophoretic particles 5, i.e., white particles 5a and colored particles 5b differing in color tone from the white particles 5a, in this embodiment) in a liquid-phase dispersion medium 6.

A task of dispersing the electrophoretic particles 5 in the liquid-phase dispersion medium 6 can be performed by using one or more of, e.g., a paint shaker method, a ball mill method, a media mill method, an ultrasonic dispersion method and a stirrer dispersion method.

A dispersion medium that exhibits low solubility to the capsule body 401 and has relatively high insulation performance is preferably used as the liquid-phase dispersion medium 6.

Examples of the liquid-phase dispersion medium 6 include: waters such as distilled water and deionized water; alcohols such as methanol; cellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitrites such as acetonitrile; amides such as N,N-dimethylformamide; carboxylic salts; oils; and the like. One or more of them may be used independently or in combination.

It is preferred that the liquid-phase dispersion medium 6 is mainly constituted of the aliphatic hydrocarbons (the liquid paraffins). Use of the liquid paraffins is preferred because each of the liquid paraffins has a greater effect in preventing the electrophoretic particles 5 from clumping together and exhibits reduced affinity with (reduced solubility to) the constituent material of the capsule body 401.

This makes it possible to reliably prevent or reduce overtime degradation in display performance of the electrophoretic display device 20. Furthermore, each of the liquid paraffins does not have unsaturated bonds and therefore the use of the liquid paraffins is also preferred in terms of increased weather resistance and improved safety.

If necessary, various kinds of additives may be added to the liquid-phase dispersion medium 6 (the electrophoretic dispersion liquid 10). Examples of such additives include: a charge-controlling agent formed of particles of an electrolyte, a (anionic or cationic) surfactant such as alkenylsuccinate, a metal soap, a resin material, a rubber material, an oil, a varnish or a compound; a dispersion agent such as a silane-based coupling agent; a lubricating agent; a stabilizing agent; and the like.

Further, in the case where the liquid-phase dispersion medium 6 is colored, if necessary, a dye may be dissolved therein. Examples of the dye include an anthraquinone-based dye, an azo-based dye, an indigoid-based dye, and the like.

The electrophoretic particles 5 are particles which are charged and can be electrophoretically moved in the liquid-phase dispersion medium 6 under the action of the electric fields. Such electrophoretic particles 5 may be of any type as long as they are charged.

Although there is no particular limitation, at least one kind of pigment particles, resin particles and composite particles thereof may be preferably used as the electrophoretic particles 5. These kinds of particles provide advantages in that they can be manufactured with ease and can perform a charge-controlling task in a relatively easy manner.

Examples of a pigment of which the pigment particles are made include: a black pigment such as aniline black, carbon black or titanium black; a white pigment such as titanium dioxide or antimony oxide; an azo-based pigment such as monoazo; a yellow pigment such as isoindolinone or chrome yellow; a red pigment such as quinacridone red or chrome vermilion; a blue pigment such as phthalocyanine blue or indanthrene blue; a green pigment such as phthalocyanine green; and the like. One or more of these pigments may be used independently or in combination.

Examples of a resin material of which the resin particles are made include an acryl-based resin, an urethane-based resin, an urea-based resin, an epoxy-based resin, polystyrene, polyester and the like. One or more of these resin materials may be used independently or in combination.

Examples of the composite particles include: particles produced by coating surfaces of the pigment particles with the resin material or other pigment; particles produced by coating surfaces of the resin particles with the pigment; and particles made of a mixture obtained by mixing the pigment and the resin material in a suitable composition ratio.

Examples of the particles produced by coating the surfaces of the pigment particles with the other pigment include particles obtained by coating surfaces of titanium dioxide particles with silicon oxide or aluminum oxide. These particles are preferably used as the white particles 5a.

Carbon black particles or particles produced by coating surfaces of the carbon black particles with other material are preferably used as the colored particles (the black particles) 5b.

A shape of the electrophoretic particles 5 may preferably be a spherical shape, but is not particularly limited thereto.

Considering dispersibility of the electrophoretic particles 5 in the liquid-phase dispersion medium 6, electrophoretic particles 5 each having a smaller particle size are preferably used. Specifically, an average particle size of the electrophoretic particles 5 is preferably in the range of about 10 to 500 nm, and more preferably in the range of about 20 to 300 nm.

If the average particle size of the electrophoretic particles 5 falls within the above-noted range, the electrophoretic particles 5 can have a suitable size. Therefore, it is possible to reliably prevent the electrophoretic particles 5 from clumping together or sinking in the liquid-phase dispersion medium 6. Namely, the electrophoretic particles 5 can be stably dispersed therein. As a result, it becomes possible to prevent degradation in display quality of the electrophoretic display device 20.

In the case where two different particles of different colors are used as in this embodiment, it is preferred that they have different average particle sizes. It is particularly preferred that the average particle size of the white particles 5a is set greater than that of the colored particles 5b. This makes it possible to increase a display contrast and retention characteristics of the electrophoretic display device 20.

More specifically, it is preferred that the average particle size of the colored particles 5b is in the range of about 20 to 100 nm, and the average particle size of the white particles 5a is in the range of about 150 to 300 nm.

It is also preferred that a specific gravity of the electrophoretic particles 5 is set almost equal to that of the liquid-phase dispersion medium 6. This ensures that the electrophoretic particles 5 can stay in specified positions within the liquid-phase dispersion medium 6 for a long period of time, even after a voltage application to between the first electrodes 3 and the second electrode 4 is stopped. That is to say, information displayed on the electrophoretic display device 20 is visibly retained for a long period of time.

The binder 41 is provided between the opposite substrate 11 and the base substrate 12 for the purpose of, e.g., bonding the opposite substrate 11 and the base substrate 12 together, fixing the microcapsules 40 between the opposite substrate 11 and the base substrate 12, and assuring insulation between the first electrodes 3 and the second electrode 4. This makes it possible to increase durability and reliability of the electrophoretic display device 20.

Preferably used as the binder 41 is a resin material that exhibits high affinity with (improved adhesion to) the respective electrodes 3 and 4 and the capsule bodies 401 (of the microcapsules 40) and exhibits increased insulation performance which does not allow a current to flow at all or allows a current to slightly flow.

Examples of such a resin material used as the binder 41 include: a thermoplastic resin such as polyethylene, polypropylene, ABS resin, methacrylate resin (e.g., methyl methacrylate resin), vinyl chloride resin or cellulose-based resin; silicone-based resin; urethane-based resin; and the like. One or more of these materials may be used independently or in combination.

In this embodiment, the electrophoretic display sheet 21 and the circuit board 22 are bonded together by means of the adhesive agent layer 8. This makes it possible to fix the electrophoretic display sheet 21 and the circuit board 22 in a reliable manner.

In addition to the function of bonding (fixing) the electrophoretic display sheet 21 and the circuit board 22 together, the adhesive agent layer 8 preferably has functions of: I) making insulation; II) preventing ions from diffusing from the electrophoretic display sheet 21 to the circuit board 22; and III) relieving stresses generated in the process of bonding the electrophoretic display sheet 21 and the circuit board 22 together.

Provision of the function I) makes it possible to reliably prevent occurrence of short circuit between the first electrodes 3 and the second electrode 4, thus allowing the electric fields to surely act on the electrophoretic particles 5. Provision of the function II) makes it possible to prevent or reduce a decline of characteristics of circuits (especially, switching elements) formed in the circuit board 22.

Further, provision of the function III) makes it possible to prevent breakage of the microcapsules 40 or the switching elements (the circuit) formed in the circuit board 22, which would otherwise occur in the process of manufacturing the electrophoretic display device 20.

Especially, in the present invention, the microcapsules 40 make point-to-point contact with the adhesive agent layer 8. Therefore, by providing the above function III) to the adhesive agent layer 8, it is possible to prevent applying excess pressure to the microcapsules 40. This makes it possible to reliably prevent each of the microcapsules 40 from becoming a non-spherical shape.

It is preferred that the adhesive agent layer 8 is mainly constituted of polyurethane. This is because the polyurethane is capable of reliably imparting the functions as described above to the adhesive agent layer 8.

The polyurethane contains an isocyanate component and a polyol component. The isocyanate component may be, e.g., at least one kind of tetramethylxylene diisocyanate (TMXDI), hexamethylene diisocyanate (HMDI) and derivatives thereof. The polyol component may be, e.g., at least one kind of polypropylene glycol (PPG), polytetramethylene glycol (PTMG) and derivatives thereof.

In addition to the polyurethane, examples of the constituent material of the adhesive agent layer 8 further include a resin material such as polyethylene, chlorinated polyethylene, ABS resin, vinyl acetate copolymer, fluorine-based resin or silicone-based resin, and the like. One or more of these materials may be used independently or in combination.

Assuming that an average thickness of the adhesive agent layer 8 is A (μm) and an average thickness of the microcapsule-containing layer 400 is B (μm), a relation of A/B is preferably in the range of 0.1 to 3, and more preferably in the range of 0.5 to 2. By satisfying this relation, it is possible to improve the functions I) and III) described above.

In this regard, it is to be noted that the average thickness of the adhesive agent layer 8 is preferably in the range of about 1 to 30 μm, and more preferably in the range of about 5 to 20 μm.

The sealing part 7 is provided between the base portions 1 and 2, and along peripheral edges of the first electrodes 3, the second electrode 4, the microcapsule-containing layer 400 and the adhesive agent layer 8. The first electrodes 3, the second electrode 4, the microcapsule-containing layer 400 and the adhesive agent layer 8 are air-tightly sealed by means of the sealing part 7.

This makes it possible to prevent moisture from infiltrating into the electrophoretic display device 20, thereby reliably avoiding degradation in display performance of the electrophoretic display device 20.

Various kinds of resin materials can be used as a constituent material of the sealing part 7. Examples of such resin materials include: a thermoplastic resin such as acryl-based resin, urethane-based resin or olefin-based resin; a thermosetting resin such as epoxy-based resin, melamine-based resin or phenol-based resin; and the like. One or more of these resin materials may be used independently or in combination.

In this regard, it is to be noted that the sealing part 7 may be either provided or removed depending on the circumstances.

The present invention is characterized by a construction of the microcapsules 40 included in the microcapsule-containing layer 400. Hereinafter, the construction of the microcapsules 40 will be described in detail.

As shown in FIG. 1, each of the microcapsules 40 has a size corresponding to a full thickness of the microcapsule-containing layer 400, and the microcapsules 40 are arranged lengthwise and crosswise between the opposite substrate 11 and the base substrate 12 so as to form a single layer (in which the microcapsules 40 are arranged side by side with no overlap in the thickness direction of the microcapsule-containing layer 400).

Further, in this embodiment, the microcapsules 40 are arranged so that each of the microcapsules 40 can straddle two neighboring first electrodes 3.

Such arrangement of the microcapsules 40 makes it possible for each of the first electrodes 3 to operate the electrophoretic particles 5 contained in two of the microcapsules 40 straddling the same. As a result, different colors are displayed in a single microcapsule 40.

With the present invention, the microcapsules 40 arranged as above are kept in a generally spherical shape without being compressed (pressed), even if they are sandwichedly held by the second electrode 4 and the adhesive agent layer 8 in between the opposite substrate 11 and the base substrate 12.

As will be set forth later, the electrophoretic display device 20 is generally manufactured by interposing the adhesive agent layer 8 between the circuit board 22 and the electrophoretic display sheet 21 and bonding the circuit board 22 and the electrophoretic display sheet 21 together under that state.

The bonding is performed in a state that the circuit board 22 and the electrophoretic display sheet 21 are kept in proximity to each other. Pressure is applied between the circuit board 22 and the electrophoretic display sheet 21 in order to bring them into proximity to each other. Magnitude of the pressure is generally set equal to about 0.2 to 0.6 MPa.

At this time, the microcapsules 40 make point-to-point contact with the adhesive agent layer 8 and the second electrode 4 as shown in FIG. 1. For this reason, the load (pressure) acting on a unit area of the contact portions becomes greater. Specifically, pressure of about 0.8 to 2.4 MPa is applied to the contact portions.

Further, in the case where the electrophoretic display device 20 of the present invention is used in an electronic paper that requires flexibility, bending (flexural deformation) occurs in the electrophoretic display device 20 as the electronic paper is bended. For this reason, pressure is applied between the circuit board 22 and the electrophoretic display sheet 21.

With the present invention, the microcapsules 40 have strength great enough to keep a spherical shape between the second electrode 4 and the adhesive agent layer 8 even when pressure is applied between the circuit board 22 and the electrophoretic display sheet 21. This makes it possible to increase pressure resistance and bleed resistance of the microcapsules 40, thereby ensuring that the electrophoretic display device 20 is stably operated for a long period of time.

The term "pressure resistance of the microcapsules 40" used herein refers to a property with which the microcapsules 40 resist the pressure applied thereto without being crushed. The term "bleed resistance of the microcapsules 40" used herein refers to a property with which the liquid dispersion medium 6 encapsulated into the microcapsules 40 is kept against dissipation to the outside.

It is preferred that the microcapsules 40 exist between the opposite substrate 11 and the base substrate 12 in such a state as to maintain a shape closer to a sphere. A degree of the spherical shape of the microcapsules 40 can be identified by using sphericity as an index. More specifically, a Heywood circularity factor Fc is preferably used as the index.

In this regard, it is to be noted that the Heywood circularity factor Fc denotes a value calculated by the following equation (1).

$$Fc = P/\{2 \times \text{sqrt}(\pi A)\} \tag{1}$$

In the equation (1), the Fc stands for the Heywood circularity factor, the P signifies a perimeter of each of the microcapsules 40 in a plan view, and the A denotes an area (cross-sectional area) of each of the microcapsules 40 in a plan view.

As is apparent from the equation (1), the Heywood circularity factor Fc refers to a ratio of a perimeter $\{2 \times \text{sqrt}(\pi A)\}$ of an imaginary circle having the same area as the area of each of the microcapsules 40 in a plan view to the perimeter P of each of the microcapsules 40 in a plan view.

It can be evaluated that, as the factor Fc calculated by the equation (1) approaches 1, a plane shape of the microcapsules 40 comes closer to a circle and a solid shape thereof gets closer to a sphere (which means that the sphericity is high).

It is preferred that the microcapsule-containing layer 400 contains microcapsules 40 having increased sphericity in a large quantity. Specifically, it is preferred that a spherical particle ratio calculated by the following equation (2) is equal to or greater than 60%.

$$\text{spherical particle ratio} = (N_{1.08}/N_{1.40}) \times 100 \tag{2}$$

In the equation (2), the $N_{1.40}$ is the number of microcapsules 40 having the Heywood circularity factor Fc of 1.40 or less and the $N_{1.08}$ is the number of microcapsules 40 having the Heywood circularity factor Fc of 1.08 or less, in a plan view of the microcapsule-containing layer 400 as seen from the side of one major surface thereof.

The spherical particle ratio found by the equation (2) corresponds to a percentage of the microcapsules 40 having high sphericity (i.e., the microcapsules whose Heywood circularity factor Fc is 1.08 or less) under the assumption that most of the microcapsules 40 present in the microcapsule-containing layer 400 have the Heywood circularity factor Fc of 1.40 or less.

In the case where the spherical particle ratio found by the equation (2) is 60% or more, preferably 80% or more, and more preferably 90% or more, the microcapsule-containing layer 400 contains, in a large quantity, microcapsules 40 having the high sphericity, i.e., microcapsules 40 superior in the pressure resistance and the bleed resistance. Thus, the electrophoretic display device 20 can stably operate for a long period of time.

In the present invention, the Heywood circularity factor Fc, the $N_{1.40}$, the $N_{1.08}$ and the spherical particle ratio are found in the following manner based on a plane image which is obtained by performing specified image processing on a micrograph of the microcapsule-containing layer 400 taken from the side of the one major surface thereof.

Figure 2:
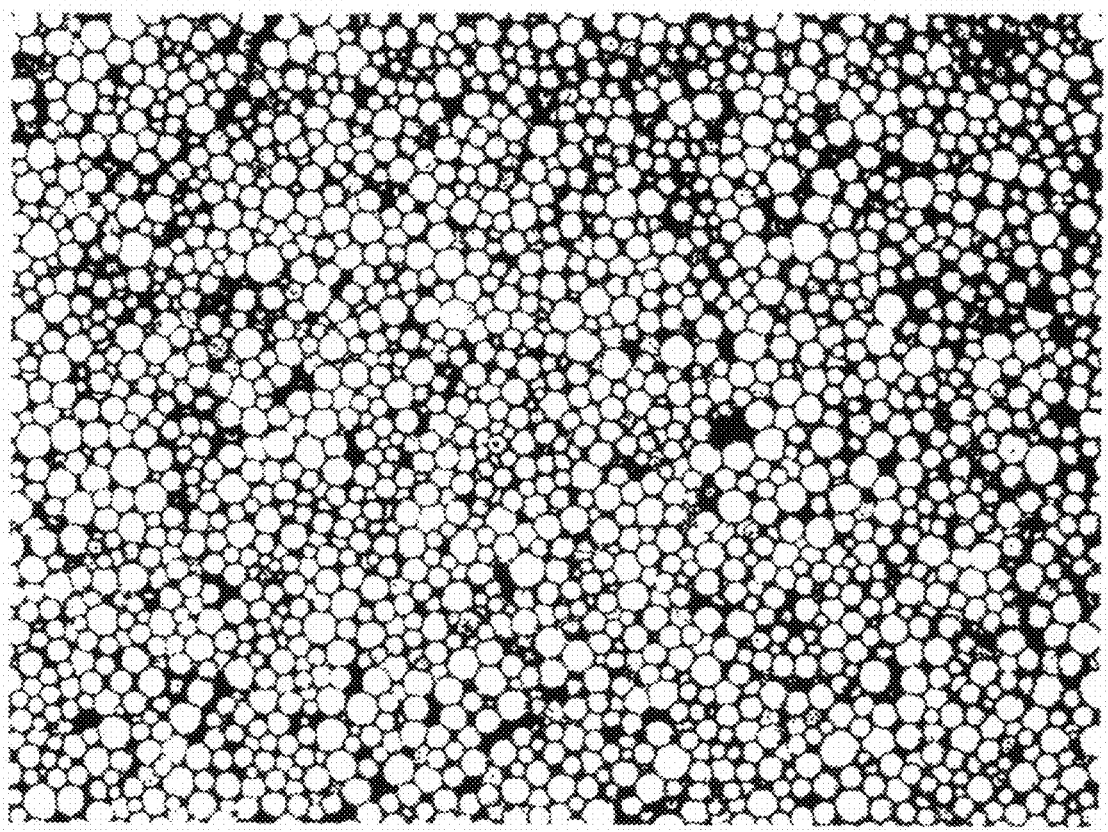
FIG. 2 is a diagram showing one example of a micrograph to be used for measuring a Heywood circularity factor.

First, the micrograph of the microcapsule-containing layer 400 is obtained by photographing the microcapsule-containing layer 400 from the side of the one major surface thereof, e.g., in a 300 magnification, using a microscope. One example of the micrograph is illustrated in FIG. 2.

Next, contours of image elements having a generally circular shape (i.e., circular image elements) are detected and inner regions of the circular image elements are cleared in white.

Figure 3:
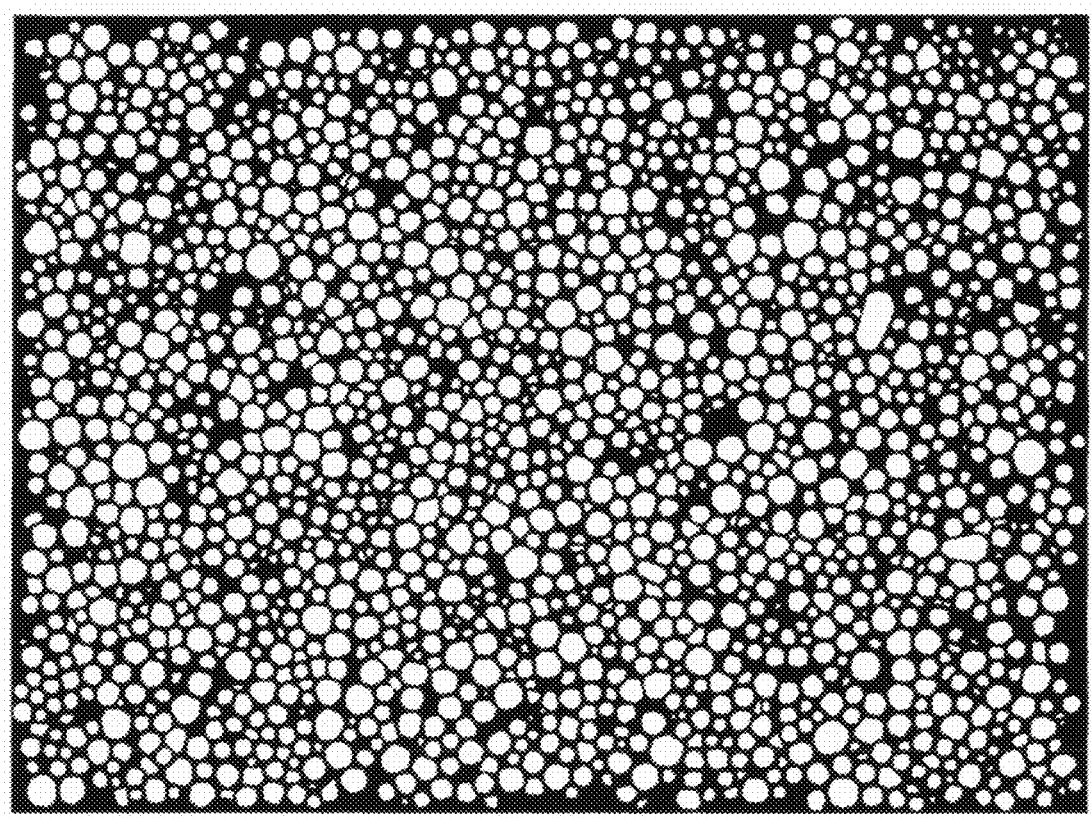
FIG. 3 is a diagram showing one example of a plane image obtained by performing image processing on the micrograph shown in FIG. 2.

Then, a plane image is obtained by removing, one by one, circular image elements contacted with a peripheral edge of the micrograph, large size circular image elements composed of a plurality of the circular image elements joined together, and circular image elements whose size is clearly smaller than that of the microcapsules 40. One example of the plane image thus obtained is illustrated in FIG. 3.

Next, the respective circular image elements remaining undeleted in the plane image are regarded as the microcapsules 40. The perimeter P and the area A of the circular image elements are measured and the Heywood circularity factor Fc thereof is calculated.

Circular image elements each having the Heywood circularity factor Fc of 1.40 or less are extracted and the number $N_{1.40}$ of the circular image elements thus extracted is counted.

Furthermore, circular image elements each having the Heywood circularity factor Fc of 1.08 or less are extracted and the number $N_{1.08}$ of the circular image elements thus extracted is counted.

Thereafter, the spherical particle ratio=$(N_{1.08}/N_{1.40}) \times 100$ is calculated using the values $N_{1.08}$ and $N_{1.40}$ thus counted.

In this regard, it is to be noted that a percentage of the region other than the circular image elements in the plane image is preferably 20% or less, and more preferably 10% or less. The region other than the circular image elements corresponds to gaps between the microcapsules 40. If the percentage of this region is great, the display contrast of the electrophoretic display device 20 may possibly be reduced.

In addition to defining the circularity of the respective microcapsules 40 in terms of a plan view seen from the side of the major surface of the microcapsule-containing layer 400 as set forth above, it is preferred that circularity of the respective microcapsules 40 is defined in terms of a cross section taken along a direction orthogonal to the major surface of the microcapsule-containing layer 400. By defining the circularity in terms of the cross section in this manner, it becomes possible to reliably evaluate the sphericity of the microcapsules 40.

In the case where the circularity of the respective microcapsules 40 is defined in terms of the cross section, it is equally possible to use the Heywood circularity factor Fc. For example, the circularity of the respective microcapsules 40 can be defined by an average value of the Heywood circularity factors Fc in the cross section found in the manner as noted above.

More specifically, the average value of the Heywood circularity factors Fc is preferably in the range of about 1.00 to 1.10, and more preferably in the range of about 1.00 to 1.06. The microcapsules 40 with the average value of the Heywood circularity factors Fc in the cross section falling within the range noted just above can be evaluated to have increased sphericity and superior pressure resistance and bleed resistance.

If the microcapsules 40 exist in a generally spherical shape as described above, each of them makes contact with the adhesive agent layer 8 and the second electrode 4 at a circular contact portion. A diameter (μm) of the contact portion is preferably ½ or less, and more preferably in the range of about ⅓ to ⅕ of a diameter (particle size) (μm) of the microcapsules 40.

The sphericity of the microcapsules 40 can also be evaluated from this viewpoint. If this relationship is met, the microcapsules 40 can be evaluated to have increased sphericity and superior pressure resistance and bleed resistance.

In such microcapsules 40, the capsule body (shell) 401 that encapsulates the electrophoretic dispersion liquid 10 containing the electrophoretic particles 5 may be of any configuration, insofar as strength thereof is great enough to keep the microcapsules 40 in a spherical shape between the opposite substrate 11 and the base substrate 12 even when the pressure mentioned above is applied to the microcapsules 40.

In this embodiment, the capsule body (shell) 401 includes a first capsule layer (first layer) 402 and a second capsule layer (second layer) 403 arranged outside the first capsule layer 402, as shown in FIG. 1. By constructing the capsule body 401 from the two layers, namely, the first capsule layer 402 of spherical shell shape and the second capsule layer 403 of spherical shell shape covering an outer surface of the first capsule layer 402, it becomes possible to synergistically impart characteristics of the two layers to the capsule body 401.

More specifically, in the case where the capsule body 401 is constructed from the two layers, namely, the first capsule layer 402 and the second capsule layer 403, it is preferred that the second capsule layer 403 has higher elasticity than that of the first capsule layer 402.

By employing such construction, the second capsule layer 403 becomes more abundant in elasticity than the first capsule layer 402, and the first capsule layer 402 grows more abundant in rigidity than the second capsule layer 403.

This allows the first capsule layer 402 to serve as a shape-keeping layer for keeping the shape of the capsule body 401 (microcapsules 40). Furthermore, since the highly rigid shape-keeping layer has an increased density, the electrophoretic dispersion liquid 10 is hard to permeate the same. Thus, the first capsule layer 402 can also perform a function of increasing the bleed resistance of the microcapsules 40.

On the other hand, the second capsule layer 403 can function as a deformation-absorbing layer for absorbing a change in a shape of the capsule body 401 (microcapsules 40) which would occur when pressure is applied between the opposite substrate 11 and the base substrate 12.

The functions as the shape-keeping layer and the deformation-absorbing layer, i.e., the abundance in elasticity of the second capsule layer 403 and the abundance in rigidity of the first capsule layer 402, can be evaluated using various kinds of indices such as tensile strength, elongation modulus, bending strength, bending elasticity modulus, compressive strength and compressive elasticity modulus.

In particular, it is preferred that the evaluation is conducted using at least one of tensile elastic coefficient and tensile elongation percentage, both of which make it possible to evaluate a difference in elasticity between the respective layers. Such indices can be measured by means of a relatively simple instrument. Thus, it is possible to reliably evaluate the functions as the shape-keeping layer and the deformation-absorbing layer.

In this regard, it is to be noted that the tensile elastic coefficient refers to an amount of stain relative to stress. As the tensile elastic coefficient grows higher, a degree of deformation caused by an external force becomes smaller, which can be evaluated to be rigid. It is possible to measure the tensile elastic coefficient under the conditions stated in the provision of ISO 527-2.

On the other hand, the tensile elongation percentage refers to an elongation percentage at breakage. It can be evaluated that toughness is superior and elasticity is abundant as the tensile elastic coefficient grows higher. It is possible to measure the tensile elongation percentage under the conditions stated in the provision of ISO 527-2.

More specifically, in the case where the first capsule layer 402 is allowed to serve as the shape-keeping layer, the tensile elastic coefficient thereof is preferably in the range of about $5 \times 10^4$ to $15 \times 10^4$ kg/cm², and more preferably in the range of about $8 \times 10^4$ to $11 \times 10^4$ kg/cm². On the other hand, the tensile elongation percentage thereof is preferably in the range of about 0.1 to 1%, and more preferably in the range of about 0.5 to 0.9%.

Furthermore, in the case where the second capsule layer 403 is allowed to serve as the deformation-absorbing layer, the tensile elastic coefficient thereof is preferably in the range of about $1 \times 10^3$ to $4 \times 10^4$ kg/cm², and more preferably in the range of about $1 \times 10^4$ to $2 \times 10^4$ kg/cm². On the other hand, the tensile elongation percentage thereof is preferably in the range of about 2 to 10% and more preferably in the range of about 3 to 6%.

Constituent materials of the first capsule layer 402 and the second capsule layer 403 are selected in view of the above-noted matters.

Examples of the constituent material of the first capsule layer (shape-keeping layer) 402 include a thermosetting resin such as melamine-based resin, amino-based resin (e.g., urea resin), epoxy-based resin or phenol-based resin, a thermoplastic resin such as acryl-based resin, urethane-based resin or olefin-based resin, and the like. One or more of them can be used independently or in combination.

Among them, it is particularly preferred that the constituent material of the first capsule layer 402 contains the melamine-based resin as a major component thereof. Since the melamine-based resin can form a three-dimensional network structure, the first capsule layer 402 made of such resin is superior in rigidity (exhibits high elasticity modulus).

As a result, the first capsule layer 402 serves as the shape-keeping layer in a preferred manner, thereby increasing the strength and the bleed resistance of the capsule body 401. This makes it possible to reliably form the microcapsules 40 into the afore-mentioned spherical shape.

In this regard, it is to be noted that a cross-linking agent may be added to the resin of which the first capsule layer 402 is made, so that the first capsule layer 402 can have a cross-linked (three-dimensionally cross-linked) structure. This makes it possible to increase the strength and the bleed resistance of the capsule body 401. As a consequence, it is possible to surely prevent or restrain the microcapsules 40 from becoming non-spherical bodies.

Examples of the constituent material of the second capsule layer (deformation-absorbing layer) 403 include a material containing gum such as gum arabic or the like, a composite material of gum arabic and gelatin, various kinds of resin materials such as epoxy-based resin, urethane-based resin, polycarbonate-based resin, polyamide-based resin and polyether-based resin, and the like. One or more of them can be used independently or in combination.

Among them, it is particularly preferred that the constituent material of the second capsule layer 403 contains the epoxy-based resin as a major component thereof. This ensures that the second capsule layer 403 has the elasticity modulus mentioned above and possesses a suitable degree of the rigidity and the elasticity in combination.

Furthermore, it is preferred that the first capsule layer 402 and the second capsule layer 403 are chemically bonded together in their interfacial surfaces. This makes it possible to reliably prevent occurrence of any separation of the first capsule layer 402 and the second capsule layer 403 even when pressure is applied between the circuit board 22 and the electrophoretic display sheet 21.

This results in an increase in the strength and the bleed resistance of the capsule body 401. Therefore, it is possible to reliably prevent the microcapsules 40 from being collapsed due to the pressure applied at the time of bonding the microcapsule-containing layer 400 and the circuit board 22 together or due to the impact and the pressing force applied when the microcapsules 40 are used and stored as a display device.

In the case where the constituent material of the first capsule layer 402 contains the melamine-based resin as the major component thereof and the constituent material of the second capsule layer 403 contains the epoxy-based resin as the major component thereof, they are chemically bonded together in the following method.

For example, in the below-mentioned process of forming the first capsule layer 402, a compound having mercapto groups and carboxyl groups and/or sulfo groups is added to a core material dispersion liquid to form the first capsule layer 402 into which the mercapto groups are introduced. Thereafter, the second capsule layer 403 is formed from an epoxy-based resin material.

A thickness of the capsule body 401 (a total sum of a thickness d1 of the first capsule layer 402 and a thickness d2 of the second capsule layer 403 in this embodiment) is not particularly limited to a specific value, but is preferably in the range of 0.1 to 5 μm, more preferably in the range of 0.1 to 4 μm, and even more preferably in the range of 0.1 to 3 μm in a wet state.

If the thickness of the capsule body 401 is too small, there is a fear that great enough capsule strength may not be obtained depending on combination of the constituent materials of the first capsule layer 402 and the second capsule layer 403.

In contrast, if the thickness of the capsule body 401 is too great, there is a fear that transparency may be reduced depending on the combination of the constituent materials of the first capsule layer 402 and the second capsule layer 403, which may lead to reduction in the display contrast of the electrophoretic display device 20.

A ratio d1/d2 of the thickness d1 of the first capsule layer 402 and the thickness d2 of the second capsule layer 403 is preferably in the range of about 1 to 1/5, and more preferably in the range of about ½ to ⅓. By complying with this relationship, it becomes possible to reliably impart the characteristics of the first capsule layer 402 and the second capsule layer 403 to the capsule body 401.

Although the capsule body 401 has two layers consisting of the first capsule layer 402 and the second capsule layer 403 in this embodiment, the capsule body 401 is not limited to this two-layer construction but may have a single-layer construction or a multiple-layer construction with three or more layers.

As for a particle size of the capsule body 401, a volume-average particle size thereof is preferably in the range of 30 to 60 μm, and more preferably in the range of 40 to 50 μm. If the particle size of the capsule body 401 falls within such a range, it is possible to form the microcapsule-containing layer 400 with increased dimensional accuracy.

If the particle size of the capsule body 401 is far smaller than the lower limit value noted above, there is a fear that both major surfaces of the microcapsule-containing layer 400 became full of the microcapsules 40, thereby reducing the display contrast of the electrophoretic display device 20.

In contrast, if the particle size of the capsule body 401 is far greater than the upper limit value noted above, there is a fear that the gaps 43 between the microcapsules 40 grows wider, consequently reducing the display contrast of the electrophoretic display device 20.

It is preferred that the microcapsules 40 are formed so as to have a generally uniform or equal size (particle size). More specifically, a coefficient of variation (CV value) of the particle size is preferably in the range of 5 to 15%, and more preferably in the range of 5 to 10%.

This ensures that the microcapsules 40 are arranged uniformly, thereby preventing or reducing occurrence of display variance in the electrophoretic display device 20. Thus, the electrophoretic display device 20 is capable of exercising superior display performance.

2 Operating Method of Electrophoretic Display Device

Such an electrophoretic display device 20 is operated as follows. Description will now be made regarding an operating method of the electrophoretic display device 20.

Figure 4A:
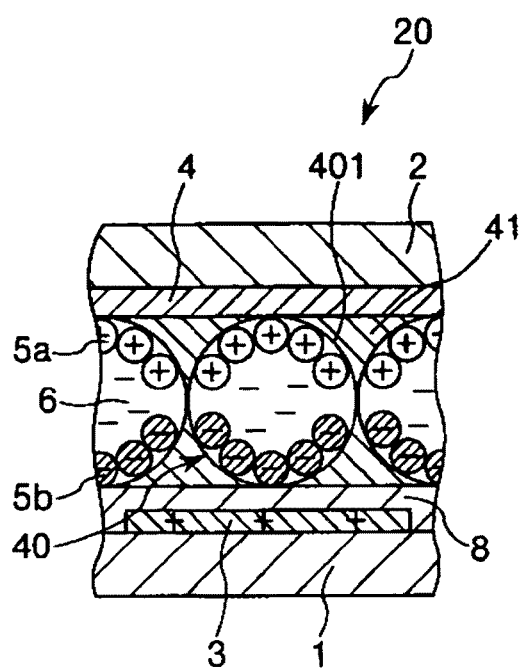
FIGS. 4A and 4B are pattern diagrams for explaining an operating method of the electrophoretic display device shown in FIG. 1.
Figure 4B:
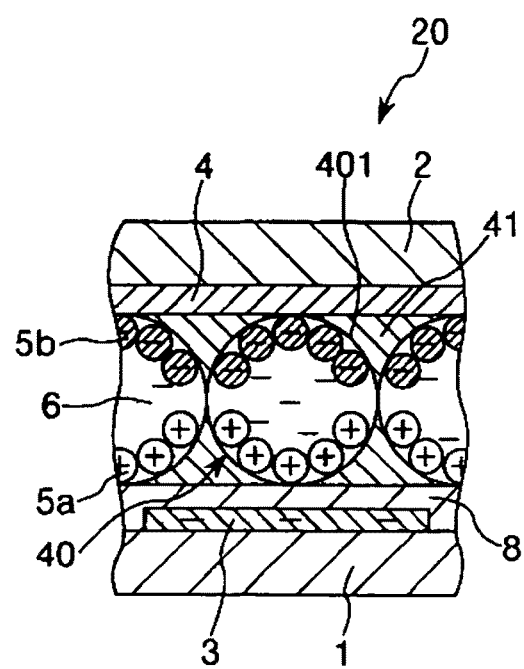

FIGS. 4A and 4B are pattern diagrams for explaining an operating method of the electrophoretic display device shown in FIG. 1. Hereinafter, the upper side in these figures will be referred to as "top" and the lower side will be referred to as "lower".

Upon applying a voltage to between the first electrodes 3 and the second electrode 4 of the electrophoretic display device 20, electric fields are generated across them. The electric fields allow the electrophoretic particles 5 (the colored particles 5b and the white particles 5a) to electrophoretically move toward the respective electrodes.

For example, if positively charged particles are used as the white particles 5a and negatively charged particles are used as the colored particles (black particles) 5b, and if the first electrodes 3 are kept in a positive electric potential as illustrated in FIG. 4A, the white particles 5a are moved toward and gathered on the second electrode 4.

On the other hand, the colored particles 5b are moved toward and gathered on the first electrodes 3. Therefore, when observing the electrophoretic display device 20 from a top thereof (namely, a display surface side), a color of the white particles 5a, i.e., a white color, is seen.

In contrast, if the first electrodes 3 are kept in a negative electric potential as illustrated in FIG. 4B, the white particles 5a are moved toward and gathered on the first electrodes 3. On the other hand, the colored particles 5b are moved toward and gathered on the second electrode 4. Therefore, when observing the electrophoretic display device 20 from the top thereof (namely, the display surface side), a color of the colored particles 5b, i.e., a black color, is seen.

If an electrifying amount of the electrophoretic particles 5 (the white particles 5a and the colored particles 5b), a polarity of the first electrodes 3 and the second electrode 4, a potential difference between the first electrodes 3 and the second electrode 4 and the like are suitably set in the configuration set forth above, desired information (an image) is displayed on the display surface of the electrophoretic display device 20 according to combination of colors of the white particles 5a and the colored particles 5b and the number of such particles gathered in the first electrodes 3 and the second electrode 4.

In this regard, the microcapsules 40 included in the microcapsule-containing layer 400 of the electrophoretic display device 20 exist in a spherical shape and therefore exhibit superior pressure resistance and bleed resistance.

Accordingly, even if an impact is applied to the electrophoretic display device 20 or the display surface thereof is pressed during the operation or storage of the electrophoretic display device 20, it is possible to prevent occurrence of any rupture of the microcapsules 40 and any dissipation of the electrophoretic dispersion liquid 10. Thus, the electrophoretic display device 20 is capable of stably operating for a long period of time.

3 Manufacturing Method of Electrophoretic Display Device

The electrophoretic display device 20 can be manufactured in the following manner. Hereinafter, a method of manufacturing the electrophoretic display device 20 will be described in detail.

FIGS. 5A to 5D and 6E to 6G are pattern diagrams for explaining a method of manufacturing the electrophoretic display device 20 shown in FIG. 1. In the following description, the upper side in each of FIGS. 5A to 5D and 6E to 6G will be referred to as "upper", with the lower side as "lower".

The method of manufacturing the electrophoretic display device 20 illustrated in FIGS. 5A to 5D and 6E to 6G includes: a microcapsule production step [A1] for producing the microcapsules 40; a microcapsule dispersion liquid preparation step [A2] for preparing a microcapsule dispersion liquid containing the microcapsules 40; a microcapsule-containing layer formation step [A3] for forming the microcapsule-containing layer 400 containing the microcapsules 40 on the one major surface of the base substrate 12; an adhesive agent layer formation step [A4] for forming the adhesive agent layer 8 on a major surface of the microcapsule-containing layer 400 opposite from the base substrate 12; and a bonding step [A5] for bringing the opposite substrate 11 into contact with a major surface of the adhesive agent layer 8 opposite from the microcapsule-containing layer 400, to thereby bond the adhesive agent layer 8 and the opposite substrate 11 together.

Hereinafter, description will be made on the respective steps.

[A1] Microcapsule Production Step

[A1-1] Formation of First Capsule Layer

First obtained are microcapsules in which the electrophoretic dispersion liquid 10 is encapsulated into the first capsule layer 402. For the purpose of convenience in description, these microcapsules will be referred to as "pre-microcapsules (microcapsule precursors)" hereinbelow.

The first capsule layer 402 can be formed by various kinds of microcapsule production methods, in which case the electrophoretic dispersion liquid 10 is used as a core material.

The microcapsule production methods are not particularly limited to specific types, but examples of the microcapsule production methods (methods of encapsulating the electrophoretic dispersion liquid 10 into the first capsule layer 402) include an interfacial polymerization method, an in-situ polymerization method, a phase separation method (or a coacervation method), an interfacial sedimentation method, a spray drying method, and the like. These microcapsule production methods may be suitably selected depending on the constituent material of the first capsule layer 402 or other conditions.

In the case where the melamine-based resin or the amino-based resin such as the urea resin is used as the constituent material of the first capsule layer 402, it is preferable to use the coacervation method. According to the coacervation method, it is possible to reliably form the pre-microcapsules as follows.

First, small liquid droplets of the electrophoretic dispersion liquid 10 as the core material and an initial condensation compound obtained by reacting monomers of the amino-based resin with formaldehyde are brought into coexistence in an aqueous medium. Thereafter, the initial condensation compound is subjected to a condensation reaction near surfaces of the small liquid droplets of the electrophoretic dispersion liquid 10, thereby forming a layer made of the amino-based resin (the first capsule layer 402).

Hereinafter, the coacervation method for forming the first capsule layer 402 (the pre-microcapsules) made of the amino-based resin will be described in detail.

<i> Preparation of Core Material Dispersion Liquid

A core material dispersion liquid having the small liquid droplets of the electrophoretic dispersion liquid 10 dispersed therein is first obtained by dispersing, in an aqueous medium, the electrophoretic dispersion liquid 10 which is to become the core material and which is composed of the electrophoretic particles 5 and the liquid phase dispersion medium 6.

As the aqueous medium, it is possible to use, e.g., water or mixed solvent of water and a hydrophilic organic solvent.

Examples of the hydrophilic organic solvent to be used for preparing the mixed solvent include: alcohols such as methanol, ethanol, n-propyl alcohol, isopropyl alcohol and allyl alcohol; glycols such as ethylene glycol, propylene glycol, butylene glycol, hexylene glycol, pentanediol, hexanediol, heptanediol and dipropylene glycol; ketones such as acetone, methyl ethyl ketone, methyl propyl ketone and methyl isobutyl ketone; esters such as methyl formate, ethyl formate, methyl acetate and methyl acetoacetate; ethers such as diethylene glycol monomethyl ether, diethylene glycol monoethyl ether, diethylene glycol dimethyl ether, ethylene glycol monomethyl ether, ethylene glycol monoethyl ether and dipropylene glycol monomethyl ether; and the like. One or more of them can be used independently or in combination.

In the case where the mixed solvent of the water and the hydrophilic organic solvent is used as the aqueous medium, an amount of the water contained in the mixed solvent is preferably in the range of 70 to 95 wt %, more preferably in the range of 75 to 95 wt %, and even preferably in the range of 80 to 95 wt %.

The aqueous medium may contain another solvent in addition to the water and the hydrophilic organic solvent. Examples of such a solvent include hexane, cyclopentane, pentane, isopentane, octane, benzene, toluene, xylene, ethylbenzene, aminylsqualene, petroleum ether, terpene, castor oil, soybean oil, paraffin, kerosene and the like. One or more of which can be used independently or in combination.

In the case where the other solvent is added to the aqueous medium, an amount thereof contained in the aqueous medium is preferably equal to or less than 30 wt %, more preferably equal to or less than 25 wt %, and even more preferably equal to or less than 20 wt %.

An amount of the core material dispersed in the aqueous medium is not particularly limited to a specific value, but is preferably in the range of 5 to 70 parts by mass, more preferably in the range of 8 to 65 parts by mass, and even more preferably in the range of 10 to 60 parts by mass, based on 100 parts by mass of the aqueous medium.

If the dispersion amount of the core material is too small, production efficiency may possibly be reduced because a long period of time is required in forming the first capsule layer 402 and because the pre-microcapsules having desired particle size are not prepared in a sufficient amount so that a particle size distribution thereof becomes broad.

In contrast, if the dispersion amount of the core material is too great, the pre-microcapsules may possibly not be obtained because the small liquid droplets of the core material (the electrophoretic dispersion liquid 10) is clumped together and because the aqueous medium is suspended in the core material.

If necessary, a dispersant may be used when dispersing the core material in the aqueous medium. Examples of the dispersant include water-soluble polymers such as polyvinyl alcohol (PVA), carboxymethyl cellulose (CMC), gelatin and gum arabic, surface active agents such as an anionic surface active agent, a cationic surface active agent, an anionic and cationic surface active agent and a non-ionic surface active agent, and the like. One or more of them can be used independently or in combination.

An amount of the dispersant added to the aqueous medium is not particularly limited to a specific value, but is suitably adjusted within a range that does not hinder the formation of the first capsule layer 402.

<ii> Production of Initial Condensation Compound

The initial condensation compound is obtained by subjecting the monomers of the amino-based resin and the formaldehyde to the condensation reaction.

Examples of the monomers include melamine and amino compounds including urea compounds such as urea and thiourea, one or more of which can be used independently or in combination depending on the constituent materials of the intended first capsule layer 402.

In the case where the melamine is used as the monomers, it is possible to obtain an initial condensation compound that provides melamine resin. On the other hand, in the case where one of the urea compounds is used as the monomers, it is possible to obtain an initial condensation compound that provides urea resin.

In addition, in the case where the melamine and one of the urea compounds are used in combination as the monomers, it is possible to obtain an initial condensation compound that provides a mixture of the melamine resin and the urea resin.

In general, the condensation reaction of the monomers with the formaldehyde is performed by using water as a solvent. More specifically, the monomers are added to and mixed with an aqueous formaldehyde solution, or the aqueous formaldehyde solution is added to and mixed with the monomers.

By doing so, the monomers and the formaldehyde are subjected to the condensation reaction, which provides an aqueous solution of the initial condensation compound. It is preferred that the condensation reaction is carried out while stirring the mixture by means of, e.g., a stirring device.

A mole ratio of the monomers and the formaldehyde used in the condensation reaction (monomers/formaldehyde) is not particularly limited to a specific value, but is preferably in the range of 1/0.5 to 1/10, more preferably in the range of 1/1 to 1/8, and even more preferably in the range of 1/1 to 1/6.

If the mole ratio of the monomers and the formaldehyde is too small, there is a fear that an amount of unreacted formaldehyde is increased and reaction efficiency thereof is reduced. In contrast, if the mole ratio of the monomers and the formaldehyde is too great, there is a fear that an amount of unreacted monomers is increased and the reaction efficiency thereof is reduced.

It is preferred that an initial concentration (a concentration at a feeding time) of the monomers and the formaldehyde in this condensation reaction system is kept as high as possible insofar as the concentration does not hinder the condensation reaction.

A temperature of the condensation reaction is not particularly limited to a specific value, but is preferably in the range of 55 to 85° C., more preferably in the range of 60 to 80° C., and even more preferably in the range of 65 to 75° C.

The condensation reaction is terminated, e.g., by such an operation of cooling the reaction liquid to a normal temperature (e.g., 25 to 30° C.) at the time when the condensation reaction end point is recognized. Further, a reaction time is not particularly limited to a specific value and can be suitably set depending on feeding amounts of the monomers and the formaldehyde.

<iii> Formation of First Capsule Layer

Next, the initial condensation compound obtained in the step <ii> is gradually added to the core material dispersion liquid obtained in the step <i>. By doing so, the initial condensation compound is adsorbed to the surfaces of the small liquid droplets of the electrophoretic dispersion liquid 10 and makes the condensation reaction therewith.

As a result, the resin layer (the first capsule layer 402) is formed on the surfaces of the small liquid droplets of the electrophoretic dispersion liquid 10, thereby producing the pre-microcapsules which encapsulate the electrophoretic dispersion liquid 10 thereinto.

An amount of the initial condensation compound added to the core material dispersion liquid is not particularly limited to a specific value, but is preferably in the range of 0.5 to 10 parts by mass, more preferably in the range of 0.5 to 5 parts by mass, and even more preferably in the range of 0.5 to 3 parts by mass, based on 1 part by mass of the core material.

In this regard, it is to be noted that the thickness of the first capsule layer 402 can be easily controlled by adjusting the additive amount of the initial condensation compound to the core material dispersion liquid.

If the additive amount of the initial condensation compound is too small, it becomes difficult to form the first capsule layer 402 with a great enough thickness. Depending on the kinds of the amino compounds used, there is a fear that the microcapsules 40 obtained suffer from insufficiency in the pressure resistance and the bleed resistance.

If the additive amount of the initial condensation compound is too great, the first capsule layer 402 formed grows thick. As a consequence, there is a fear that the first capsule layer 402 suffers from insufficiency in the flexibility and the transparency.

A method of adding the initial condensation compound to the core material dispersion liquid is not particularly limited to a specific type and may be any one of an one-time addition method and a stepwise addition method (a continuous addition method and/or an intermittent addition method). Furthermore, it is preferred that the initial condensation compound is added while stirring the core material dispersion liquid with a stirring device.

Moreover, it is preferred that the mercapto groups (thiol groups) are introduced into the first capsule layer 402. This ensures that, through the mercapto groups, the first capsule layer 402 and the below-mentioned second capsule layer 403 are chemically bonded together in their interfacial surfaces. Therefore, it is possible to assure increased adhesion (bonding strength) between the first capsule layer 402 and the second capsule layer 403.

The introduction of the mercapto groups into the first capsule layer 402 can be performed by, e.g., forming the first capsule layer 402 under the state that a compound (a thiol compound) having the mercapto groups (—SH groups) and the carboxyl groups (—COOH groups) and/or the sulfo groups (—$SO_3H$ groups) capable of reacting with amino groups of the initial condensation compound is added to the core material dispersion liquid.

Specifically, examples of the thiol compound include cysteine (2-amino-3-mercaptopropionic acid), mercaptoacetic acid, mercaptopropionic acid, mercaptobenzoic acid, mercaptosuccinic acid, mercaptoethanesulfonic acid, mercapto propanesulfonic acid, alkali metal salts thereof, alkaline earth metal salts thereof, ammonium salts thereof and the like, one or more of which can be used independently or in combination. Among them, it is especially preferable to use the cysteine (L-cysteine) because it is easily obtainable.

An amount of the thiol compound added to the core material dispersion liquid is not particularly limited to a specific value, but is preferably in the range of 1 to 20 parts by mass, more preferably in the range of 1 to 10 parts by mass, and even more preferably in the range of 1 to 5 parts by mass, based on 100 parts by mass of the initial condensation compound.

If the additive amount of the thiol compound is too small, the number of the mercapto groups introduced into the first capsule layer 402 is decreased. Thus, it is impossible to satisfactorily obtain the effect provided by introduction of the mercapto groups, i.e., the effect of strongly bonding the second capsule layer 403 to the first capsule layer 402.

On the other hand, if the additive amount of the thiol compound is too great, the first capsule layer 402 formed exhibits reduction in strength and may possibly suffer from insufficiency in the pressure resistance and the bleed resistance.

A method of adding the thiol compound to the core material dispersion liquid is not particularly limited to a specific type, but it is preferable to use a method by which the initial condensation compound is added to the core material dispersion liquid to obtain a mixture solution, the mixture solution is adequately stirred, and then the thiol compound is added in the form of an aqueous solution to the mixture solution.

A reaction temperature at the time of forming the first capsule layer 402 is not particularly limited to a specific value, but is preferably in the range of 25 to 80° C., more preferably in the range of 30 to 70° C., and even more preferably in the range of 35 to 60° C. A reaction time is also not particularly limited to a specific value and may be suitably set depending on feeding amounts of the reaction materials.

After carrying out the condensation reaction, it may be possible to perform an aging step in which the reaction liquid is left at a predetermined temperature. An aging temperature is not particularly limited to a specific value and may be preferably equal to or a little higher than the reaction temperature at the time of performing the condensation reaction. An aging time is not particularly limited to a specific value, but is preferably in the range of 0.5 to 5 hours, and more preferably in the range of 1 to 3 hours.

For the purposes of classifying and cleaning the pre-microcapsules produced in the above manner, the pre-microcapsules may be supplied to the next step either in a state that they are dispersed in the aqueous medium or after they are separated from the aqueous medium by a suction filtering method or a natural filtering method.

With a view to reliably prevent the first capsule layer 402 from being damaged or ruptured due to an impact or pressure applied during the filtering process, it is preferred that the pre-microcapsules are supplied to the next step without being separated from the aqueous medium.

<iv> Classifying and Cleaning of Pre-Microcapsules

Next, the pre-microcapsules are classified and cleaned.

A method of classifying the pre-microcapsules is not particularly limited to a specific type, but examples of the method include a sieving method, a filtering method, a centrifugal sedimentation method, a natural sedimentation method and the like. Among them, it is preferable to use the sieving method in the case where the pre-microcapsules to be recovered have a relatively great particle size.

A method of cleaning the pre-microcapsules is not particularly limited to a specific type, but examples of the method include a centrifugal sedimentation method, a natural sedimentation method and the like. In the case where the pre-microcapsules to be recovered have a relatively great particle size, the natural sedimentation method is preferably used in an effort to prevent the pre-microcapsules from being damaged or ruptured.

In this regard, it is to be noted that the cleaning operation need not be performed once but may be performed several times.

[A1-2] Formation of Second Capsule Layer

Next, the second capsule layer 403 is formed on an outer surface of each of the pre-microcapsules (the first capsule layer 402) obtained in the step [A1-1], thereby producing the microcapsules 40 which encapsulate the electrophoretic dispersion liquid 10 thereinto.

The second capsule layer 403 can be formed by, e.g., gradually adding a resin prepolymer to a capsule dispersion liquid in which the pre-microcapsules are dispersed in an aqueous medium, adsorbing the resin prepolymer to the surfaces of the pre-microcapsules, and then causing a polymerization reaction to them. By doing so, the second capsule layer 403 is formed on the surface of each of the pre-microcapsules, thus producing the microcapsules 40 which encapsulate the electrophoretic dispersion liquid 10 thereinto.

The aqueous medium in which the pre-microcapsules are dispersed may be the same as the aqueous medium in which the electrophoretic dispersion liquid 10 is dispersed in the step [A1-1]. In this regard, if the pre-microcapsules obtained in the step [A1-1] are dispersed in the aqueous medium, the resultant dispersion liquid may be used as the capsule dispersion liquid just as it is or after concentrating or diluting the same, if necessary.

The resin prepolymer is transformed into resin by the polymerization reaction, examples of which include resin monomers, resin oligomers, a mixture thereof and the like. More specifically, the resin prepolymer is suitably selected depending on the constituent material of the second capsule layer 403. For example, in the case where the second capsule layer 403 is composed of the epoxy-based resin, a compound containing epoxy groups (i.e., an epoxy compound) is used as the resin prepolymer.

In this regard, when the second layer 403 is composed of the epoxy-based resin, it can reliably have higher elasticity than that of the first capsule layer 402 composed of the amino-based resin. In the case where the first capsule layer 402 has the mercapto groups, the second capsule layer 403 is chemically bonded to the surface of the first capsule layer 402 through the mercapto groups. As a result, the microcapsules 40 obtained exhibit superior strength.

The epoxy compound is not particularly limited to a specific type, but may be a compound having at least one epoxy group within a single molecule. A water-soluble epoxy compound having two or more epoxy groups may be preferably used as the epoxy compound. More specifically, examples of the epoxy compound include sorbitol polyglycidyl ether, sorbitan polyglycidyl ether, polyglycerol polyglycidyl ether and the like, one or more of which can be used independently or in combination.

A mass-average molecular weight of the epoxy compound is preferably in the range of about 300 to 100,000, more preferably in the range of about 300 to 75,000, and even more preferably in the range of about 300 to 50,000.

If the mass-average molecular weight of the epoxy compound is too small, there is a fear that strength of the second capsule layer 403 formed becomes insufficient depending on the kind of the epoxy compound used. In contrast, if the mass-average molecular weight of the epoxy compound is too great, there is a fear that a viscosity of the reaction system grows higher, thus making it difficult to perform a stirring operation.

An amount of the epoxy compound added to the capsule dispersion liquid is not particularly limited to a specific value, but is preferably in the range of 0.5 to 10 parts by mass, more preferably in the range of 0.5 to 5 parts by mass, and even more preferably in the range of 0.5 to 3 parts by mass, based on 1 part by mass of the pre-microcapsules. By adjusting the additive amount of the epoxy compound, the thickness of the second capsule layer 403 can be easily controlled.

If the additive amount of the epoxy compound is too small, it becomes difficult to form the second capsule layer 403 with a great enough thickness, which may possibly lead to insufficiency in the pressure resistance of the microcapsules 40 obtained. In contrast, if the additive amount of the epoxy compound is too great, the thickness of the second capsule layer 403 formed becomes greater, which may possibly lead to insufficiency in the flexibility and the transparency thereof.

A method of adding the epoxy compound to the capsule dispersion liquid is not particularly limited to a specific type, but it is preferred that the epoxy compound is added to the capsule dispersion liquid in the form of an aqueous solution. The addition method may be any one of a one-time addition method and a stepwise addition method (a continuous addition method and/or an intermittent addition method). Furthermore, it is preferred that the epoxy compound is added while stirring the capsule dispersion liquid with a conventional stirring device well-known in the art.

It is also preferred that a cross-linking agent coexists in the capsule dispersion liquid. This makes it possible to obtain a second capsule layer 403 having a cross-linked structure. By forming the second capsule layer 403 into the cross-linked structure, it is possible increase the strength of the second capsule layer 403 and eventually the strength of the capsule body 401 as a whole. Therefore, when the microcapsules 40 are classified and cleaned later, it is possible to effectively restrain the capsule body 401 from being damaged or ruptured.

In the case where the epoxy compound is used as the resin prepolymer, the cross-linking agent may be, e.g., sodium diethyl dithio-carbamate (including hydrate thereof), diethyl ammonium diethyl dithio-carbamate (including hydrate thereof), dithio-oxalic acid or dithio-carbonic acid. One or more of them can be used independently or in combination.

An amount of the cross-linking agent added to the capsule dispersion liquid is not particularly limited to a specific value, but is preferably in the range of 1 to 100 parts by mass, more preferably in the range of 5 to 90 parts by mass, and even more preferably in the range of 10 to 80 parts by mass, based on 100 parts by mass of the epoxy compound.

If the additive amount of the cross-linking agent is too small, the effect of increasing the strength of the second capsule layer 403 is not sufficiently attained. In contrast, if the additive amount of the cross-linking agent is too great, the cross-linking agent overly reacts with the epoxy groups of the epoxy compound, which may sometimes reduce the flexibility of the second capsule layer 403.

The cross-linking agent may be added to the capsule dispersion liquid either together with the epoxy compound or before or after addition of the epoxy compound. For example, it is preferred that an aqueous solution of the epoxy compound is added to the capsule dispersion liquid and, after a while, the cross-linking agent is dropped in the form of an aqueous solution while stirring the capsule dispersion liquid.

A reaction temperature at the time of forming the second capsule layer 403 is not particularly limited to a specific value, but is preferably in the range of 25 to 80° C., more preferably in the range of 30 to 70° C., and even more preferably in the range of 35 to 60° C. A reaction time is also not particularly limited to a specific value and may be suitably set depending on feeding amounts of the reaction materials.

After forming the second capsule layer 403, it may be possible to perform an aging step in which the reaction liquid is left at a predetermined temperature. An aging temperature is not particularly limited to a specific value and may be preferably equal to or a little higher than the temperature at the time of forming the second capsule layer 403. An aging time is not particularly limited to a specific value, but is preferably in the range of 0.5 to 5 hours, and more preferably in the range of 1 to 3 hours.

The microcapsules 40 produced in the above manner may be supplied to the next step either in a state that they are dispersed in the aqueous medium or after they are separated from the aqueous medium by a suction filtering method or a natural filtering method.

If the microcapsules 40 are brought into a dry state, there is a possibility that the solvent (the liquid-phase dispersion medium 6) in the electrophoretic dispersion liquid 10 is transuded from the capsule body 401 and evaporated, which may cause deformation to the microcapsules 40. Therefore, it is preferred that the microcapsules 40 are supplied to the next step without being separated from the aqueous medium.

Further, it is preferred that the microcapsules 40 thus produced are classified and cleaned. This makes it possible to obtain microcapsules 40 having narrow particle size distribution and reduced impurities. As a classifying and cleaning methods, the same methods as employed in the step [A1-1] can be used.

[A2] Microcapsule Dispersion Liquid Preparation Step

Next, the binder 41 is prepared, and then this binder 41 is mixed with the microcapsules 40 produced in the step [A1] to thereby obtain a microcapsule dispersion liquid.

An amount of the microcapsules 40 contained in the microcapsule dispersion liquid is preferably in the range of about 30 to 60 wt %, and more preferably in the range of about 40 to 60 wt %.

If the amount of the microcapsules 40 is set to fall within the above-noted range, there is provided a great advantage in that the microcapsules 40 can be moved (or rearranged) within the microcapsule-containing layer 400 in such a manner as not to overlap one another in a thickness direction thereof (namely, in such a manner as to form a single layer).

[A3] Microcapsule Layer Formation Step

Figure 5A:
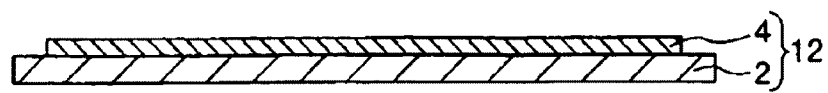
FIGS. 5A to 5D and 6E to 6G are pattern diagrams for explaining a method of manufacturing the electrophoretic display device shown in FIG. 1.
Figure 5B:
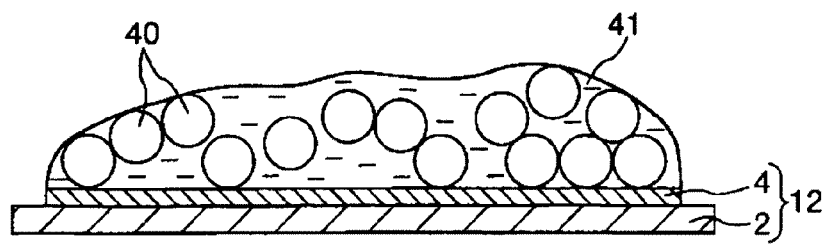

Next, the base substrate 12 is prepared as illustrated in FIG. 5A. Then, the microcapsule dispersion liquid prepared in the step [A2] is supplied on the base substrate 12 as illustrated in FIG. 5B.

A method of supplying the microcapsule dispersion liquid is not particularly limited to a specific type. As the method, various kinds of application methods such as a spin coat method, a dip coat method and a spray coat method can be used.

If necessary, the microcapsule dispersion liquid is leveled so that a thickness (quantity) thereof can become uniform across the base substrate 12, preferably so that the microcapsules 40 can be arranged side by side (in a single layer) without overlapping one another in a thickness direction of a liquid coating composed of the microcapsule dispersion liquid.

Figure 5C:
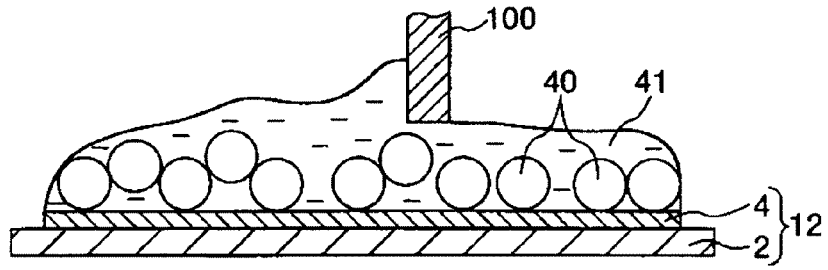
Figure 5D:
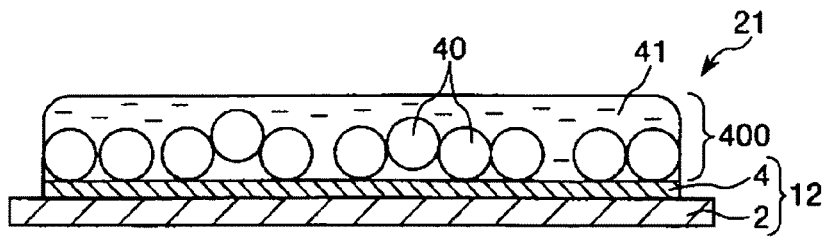

The leveling operation can be performed by, e.g., horizontally moving a squeegee (a plate-like jig) above the base substrate 12 to sweep the microcapsules 40 as illustrated in FIG. 5C. Thus, the microcapsule-containing layer 400 is formed and the electrophoretic display sheet 21 is obtained as illustrated in FIG. 5D.

[A4] Adhesive Agent Layer Formation Step

Figure 6E:
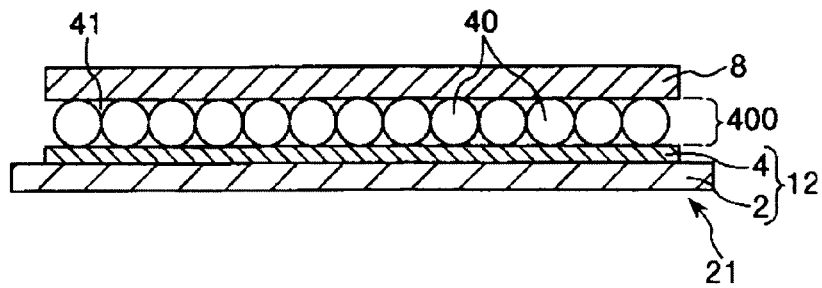

Next, the adhesive agent layer 8 is formed on the microcapsule-containing layer 400 as illustrated in FIG. 6E. This step can be performed by, e.g., arranging an adhesive agent layer 8 having a sheet shape on the microcapsule-containing layer 400 using a transfer method or the like.

[A5] Circuit Board Bonding Step

Figure 6F:
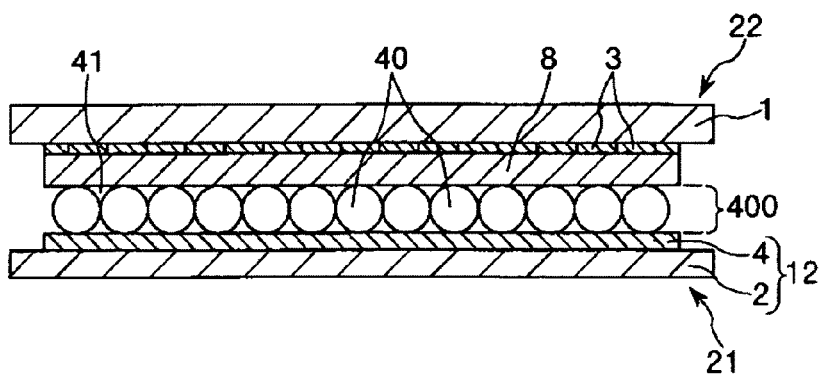

Next, as illustrated in FIG. 6F, the circuit board 22 prepared separately is laminated on the adhesive agent layer 8 so that the first electrodes 3 can come into contact with the adhesive agent layer 8. By doing so, the electrophoretic display sheet 21 and the circuit board 22 are bonded together through the adhesive agent layer 8.

At this time, an arrangement density of the microcapsules 40 in the microcapsule-containing layer 400 can be made uniform due to weight of the adhesive agent layer 8 and the circuit board 22, or by pressing the circuit board 22 and the electrophoretic display sheet 21 toward each other (by reducing the thickness of the microcapsule-containing layer 400).

When pressing the circuit board 22 and the electrophoretic display sheet 21 toward each other, magnitude of the pressure applied thereto is usually set equal to about 0.2 to 0.6 MPa.

However, in the electrophoretic display sheet 21 of the present invention, the microcapsules 40 contained in the microcapsule-containing layer 400 can be kept in a generally spherical shape without being compressed (pressed) in an up-and-down direction thereof, even if the microcapsule-containing layer 400 is pinched by the second electrode 4 and the adhesive agent layer 8 when applying the above large pressure between the circuit board 22 and the electrophoretic display sheet 21.

Consequently, it is possible to surely prevent collapse of the microcapsules 40 and dissipation of the electrophoretic dispersion liquid 10, which would otherwise be caused due to the pressure applied between the circuit board 22 and the electrophoretic display sheet 21.

[A6] Sealing Step

Figure 6G:
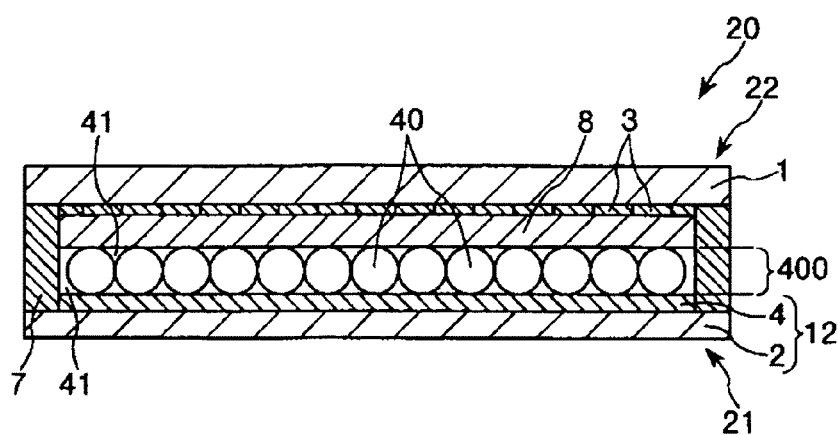

Next, as illustrated in FIG. 6G, the sealing portion 7 is formed along the edges of the electrophoretic display sheet 21 and the circuit board 22.

The sealing portion 7 can be formed by supplying a sealing portion formation material to between the electrophoretic display sheet 21 (the base portion 2) and the circuit board 22 (the base portion 1) along the edges thereof through use of, e.g., a dispenser, and then solidifying or curing the sealing portion formation material.

The electrophoretic display device 20 is manufactured through the steps described above.

With the electrophoretic display device 20 manufactured as above, the microcapsules 40 contained in the microcapsule-containing layer 400 exist in a spherical shape and therefore exhibit superior pressure resistance and bleed resistance.

Therefore, even if an impact is applied to the electrophoretic display device 20 or the display surface thereof is pressed during its operation or use, it is possible to prevent collapse of the microcapsules 40 and dissipation of the electrophoretic dispersion liquid 10. Thus, the electrophoretic display device 20 is capable of stably operating for a long period of time.

In this regard, it is to be noted that the adhesive agent layer 8 may be arranged only on the circuit board 22 or on both of the circuit board 22 and the electrophoretic display sheet 21 to thereby bond the circuit board 22 and the electrophoretic display sheet 21 together.

It is also preferred that the adhesive agent layer 8 having the sheet shape is arranged on the microcapsule-containing layer 400 by bending the same, bringing one end portion thereof into contact with microcapsule-containing layer 400 and allowing the same to progressively come into contact with the microcapsule-containing layer 400 from one end toward the other end.

By doing so, it is possible to prevent air bubbles from being left between the microcapsule-containing layer 400 and the adhesive agent layer 8, and to reliably rearrange the microcapsules 40.

Second Embodiment

Next, description will be made on a second embodiment of the electrophoretic display device in which the electrophoretic display sheet according to the present invention is used.

Figure 7:
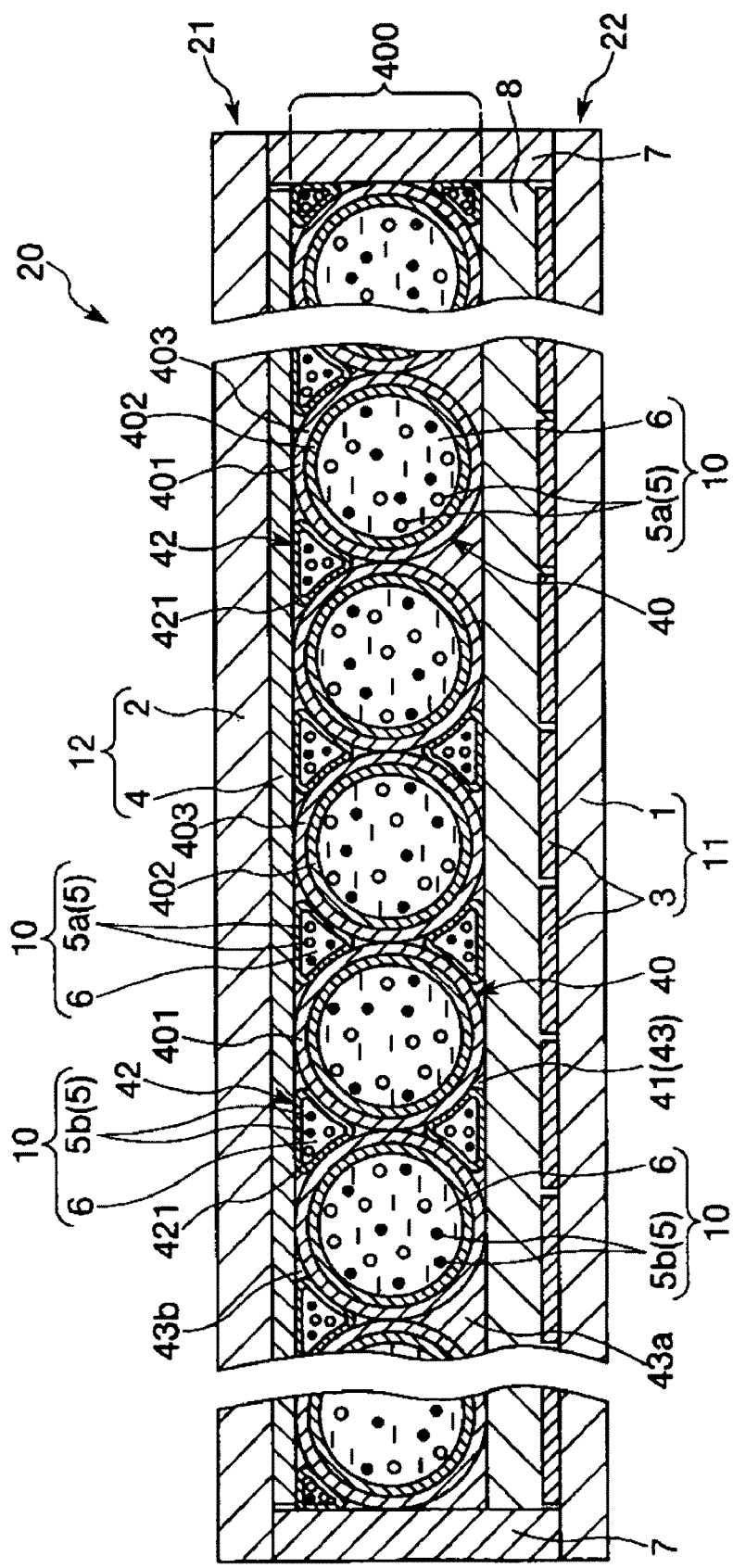
FIG. 7 is a pattern diagram showing a vertical section of a second embodiment of the electrophoretic display device according to the present invention.

FIG. 7 is a pattern diagram showing a vertical section of a second embodiment of the electrophoretic display device according to the present invention. In the following description, the upper side in FIG. 7 will be referred to as "upper" with the lower side as "lower", for the purpose of convenience in description.

Hereinafter, the electrophoretic display device of the second embodiment will be described, with emphasis placed on the differing points from the electrophoretic display device of the first embodiment but with no description made on the same matters.

The electrophoretic display device 20 shown in FIG. 7 is the same as the electrophoretic display device 20 of the first embodiment, except that a plurality of sub-microcapsules 42 for filling the gaps between the microcapsules 40 is arranged within the microcapsule-containing layer 400.

In other words, the microcapsule-containing layer 400 employed in the electrophoretic display device 20 of the second embodiment includes two kinds of microcapsules 40 and 42.

In this embodiment, the microcapsules 40 serve as main capsules that mainly contribute to display of the electrophoretic display device 20 using respective pixels thereof. The microcapsules 40 of this embodiment have the same construction as the microcapsules 40 already described in respect of the first embodiment.

In this regard, it is to be noted that although the neighboring microcapsules 40 are arranged in contact with each other according to this embodiment, they may be arranged in a spaced-apart relationship.

The sub-microcapsules 42 are formed by encapsulating an electrophoretic dispersion liquid 10 into a sub-capsule body (shell) 421. The sub-microcapsules 42 have higher flexibility and smaller size than those of the microcapsules 40. The sub-microcapsules 42 having this construction serve to fill the gaps 43 between the microcapsules 40 that play a role of the main capsules.

In other words, the sub-microcapsules 42 can be deformed and arranged in the gaps 43a between the adhesive agent layer 8 and the microcapsules 40 (i.e., the lower gaps in FIG. 7) and in the gaps 43b between the base substrate 12 and the microcapsules 40 (i.e., the upper gaps in FIG. 7), so that they can fill the gaps 43a and 43b.

More specifically, in this embodiment, the sub-microcapsules 42 are pinched (held) by the second electrode 4 and the microcapsules 40 or by the adhesive agent layer 8 and the microcapsules 40, and are pressed in an up-and-down direction thereof. Thus, each of the sub-microcapsules 42 is deformed in conformity with a shape of the gap 43a or 43b in which it is located, to have a generally triangular shape in a vertical section view of the microcapsule-containing layer 400 as shown in FIG. 7.

This construction ensures that the gaps 43a and 43b present in the microcapsule-containing layer 400 are filled with the sub-microcapsules 42, which assists in enabling the electrophoretic display device 20 to perform uniform display. As a result, an uniformly displayable area of the electrophoretic display device 20 is increased in a plan view thereof, thereby making it possible to increase the display contrast thereof.

The electrophoretic dispersion liquid 10 encapsulated into the sub-capsule body 421 is the same as the electrophoretic dispersion liquid 10 encapsulated into the capsule body 401 of each of the microcapsules 40 in the first embodiment.

Preferably, rigidity of the sub-microcapsules 42 is such that it is more flexible (more easily deformable) than the microcapsules 40. In particular, the sub-microcapsules 42 are preferably as rigid as they can be deformed when pressed by pressure of 0.2 MPa or more, and more preferably by pressure of 1 MPa or more. This ensures that the sub-microcapsules 42 are easily deformed to conform to the shapes of the gap 43a and 43b, thereby filling the gaps 43 in a reliable manner.

If the sub-microcapsules 42 are too flexible, they suffer from reduction in bleed resistance and barrier property. For this reason, there is a fear that the electrophoretic dispersion liquid 10 may flow out of the sub-capsule body 421. In contrast, if the sub-microcapsules 42 are too rigid, they are not sufficiently deformed. For this reason, there is a fear that the effect of increasing the display contrast of the electrophoretic display device 20 cannot be satisfactorily attained as compared to a case that the sub-microcapsules 42 are sufficiently deformed.

It is preferred that a particle size of the sub-microcapsules 42 is in the range of ¼ to ⅓ of the particle size of the microcapsules 40. More specifically, a volume-average particle size of the sub-microcapsules 42 is preferably in the range of 7 to 20 μm, and more preferably in the range of 10 to 18 μm. A coefficient of variation (CV value) of the particle size is preferably in the range of 5 to 15%, and more preferably in the range of 5 to 10%.

If the particle size of the sub-microcapsules 42 falls within this range, it is possible to reliably fill the gaps 43a and 43b between the microcapsules 40 with the sub-microcapsules 42 and consequently to increase the uniformly displayable area of the electrophoretic display device 20. This makes it possible to improve the display contrast thereof.

It is preferred that a constituent material of the sub-capsule body (shell) 421 has higher flexibility than the constituent material of the capsule body 401 of each of the microcapsules 40. Examples of the constituent material of the sub-capsule body 421 include a material containing gum such as gum arabic or the like, a composite material of gum arabic and gelatin, various kinds of resin materials such as urethane-based resin, melamine-based resin, urea resin, polyamide and polyether, and the like. One or more of them can be used independently or in combination.

Among them, it is preferred that the sub-capsule body 421 is mainly composed of a material containing gelatin (in particular, mainly composed of gelatin itself). This makes it possible to increase the flexibility of the sub-microcapsules 42 and also to freely change the shape thereof. Further, since the gelatin has an increased affinity to a (meth)acrylic acid ester preferably used as the binder 41, use of the gelatin assists in increasing a force with which the sub-microcapsules 42 are fixed (held) in place by the binder 41.

Examples of such gelatin include untreated gelatin, lime-treated gelatin, acid-treated gelatin, decalcified gelatin with a reduced amount of calcium, and gelatin whose methionine residues are reduced by oxidation treatment. One or more of them can be used independently or in combination.

It is preferred that the sub-microcapsules 42 have a generally uniform size (particle size). This reduces or prevents generation of the display variance in the electrophoretic display device 20, thereby enabling the electrophoretic display device 20 to exercise superior display performance.

In this regard, it is to be noted that a plurality of the sub-microcapsules 42 may be arranged in each of the gaps 43a and 43b.

The white particles 5a and the colored particles (black particles) 5b mentioned earlier are encapsulated into the sub-microcapsules 42. This ensures that the electrophoretic particles 5 encapsulated into the microcapsules 40 and the sub-microcapsules 42 operate in the manner described below, which can assure the uniform display of the electrophoretic display device 20.

The colored particles 5b in the microcapsules 40 and the sub-microcapsules 42 may have different colors, insofar as the colors fall within the same shade (dark color shade) just like black, brownish-red, dark blue and gray. This assures increased contrast and makes it possible to obtain a desired image in the electrophoretic display device 20.

The sub-microcapsules 42 may be arranged in the gaps 43a and 43b between the microcapsules 40 in such a state that they are not deformed even if the adhesive agent layer 8 or the opposite substrate 11 is bonded to the microcapsule-containing layer 400.

The same operations and effects as available in the first embodiment are attained in the second embodiment. Particularly, since the microcapsule-containing layer 400 contains the sub-microcapsules 42 as well as the microcapsules 40, the following effects can be attained in the second embodiment.

More specifically, with this electrophoretic display device 20, the electrophoretic particles (the colored particles 5*b* and the white particles 5*a*) encapsulated into the sub-microcapsules 42 operate in the same way as the electrophoretic particles within the microcapsules 40 do.

If electric fields are generated between the first electrodes 3 and the second electrode 4, the electrophoretic particles are electrophoretically moved toward any of the electrodes under the influence of the electric fields. As a result, the color of the electrophoretic particles gathered in the second electrode 4 is visually recognized from the upper side (the display surface side) of the electrophoretic display device 20.

In this embodiment, inasmuch as the sub-microcapsules 42 are filling the gaps 43*a* and 43*b*, the display surface of the electrophoretic display device 20 is full of the microcapsules 40 and the sub-microcapsules 42. This makes it possible for the electrophoretic display device 20 to uniformly display an image. As a consequence, it is possible to increase the uniformly displayable area of the electrophoretic display device 20 and to enhance the display contrast thereof.

Although the sub-microcapsules 42 are arranged (filled) in both of the gaps 43*a* and the gaps 43*b* according to this embodiment, the present invention is not limited to such an instance. Alternatively, the sub-microcapsules 42 may be selectively arranged only in the gaps formed on the pixel-recognizable side, i.e., in the gaps 43*b* formed between the base substrate 12 and the microcapsules 40. This eliminates a need to arrange the sub-microcapsules 42 in the gaps 43*a*, which can assist in reducing the amount of the sub-microcapsules 42 used.

Electronic Apparatus

The electrophoretic display device 20 described above can be used for constituting a variety of electronic apparatuses. Hereinafter, description will be made on examples of the electronic apparatus of the present invention provided with the electrophoretic display device 20.

Electronic Paper

Figure 8:
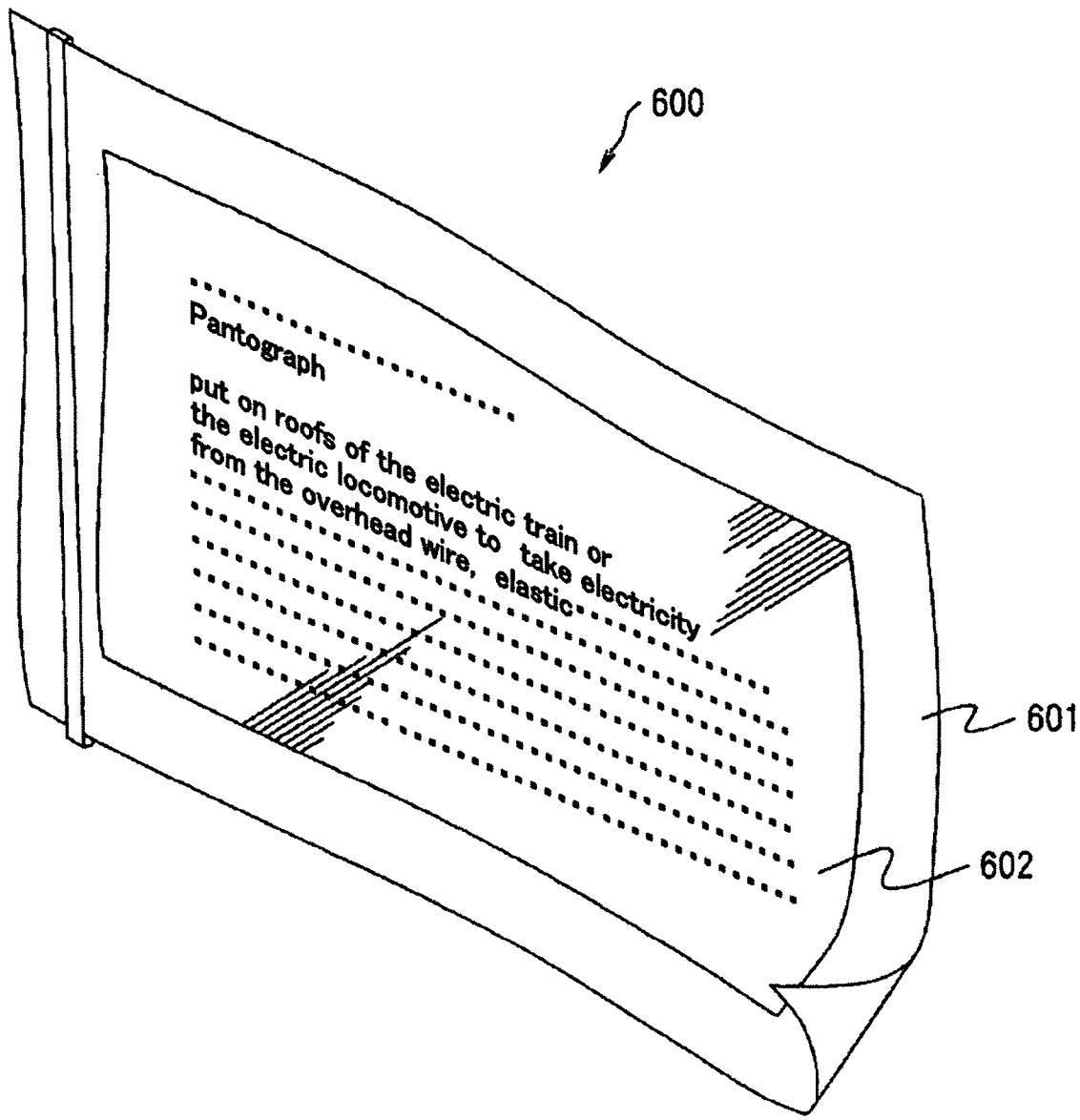
FIG. 8 is a perspective view showing an embodiment in which the electronic apparatus according to the present invention is used in an electronic paper.

First, description will be offered regarding an embodiment in which the electronic apparatus of the present invention is used in an electronic paper. FIG. 8 is a perspective view showing an embodiment in which the electronic apparatus according to the present invention is used in an electronic paper.

The electronic paper 600 shown in FIG. 8 includes a main body 601 formed of a rewritable sheet having the same texture and flexibility as that of a paper sheet, and a display unit 602 attached to the main body 601. In the electronic paper 600, the display unit 602 is formed from the electrophoretic display device 20 described above.

Display Apparatus

Figure 9A:
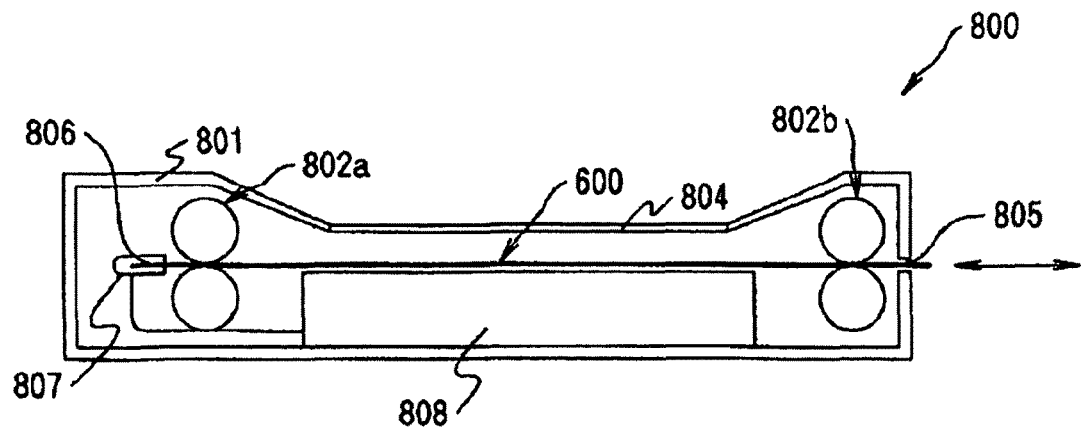
FIGS. 9A and 9B are section and plan views showing an embodiment in which the electronic apparatus according to the present invention is used in a display apparatus.
Figure 9B:
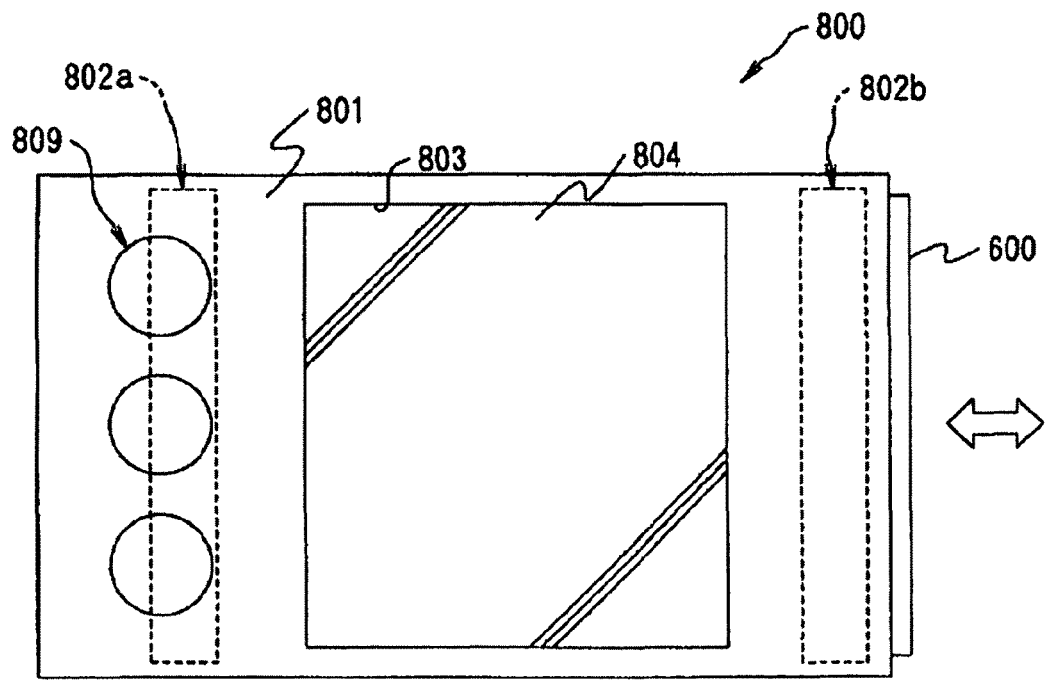

Next, description will be offered regarding an embodiment in which the electronic apparatus of the present invention is used in a display apparatus. FIGS. 9A and 9B are section and plan views showing an embodiment in which the electronic apparatus according to the present invention is used in a display apparatus.

The display apparatus 800 shown in FIGS. 9A and 9B includes a main body portion 801 and an electronic paper 600 detachably attached to the main body portion 801. The electronic paper 600 is of the same configuration as set forth above, i.e., the same configuration as shown in FIG. 8.

Formed on one lateral side (the right side in FIG. 9A) of the main body portion 801 is an insertion slot 805 through which the electronic paper 600 can be inserted. Two pairs of conveying rollers 802*a* and 802*b* are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802*a* and 802*b*.

A rectangular opening 803 is formed on a display surface side (the front side in FIG. 9B) of the main body portion 801 and a transparent glass plate 804 is fitted to the rectangular opening 803. This allows the electronic paper 600 held within the main body portion 801 to be visually recognized from the outside of the main body portion 801.

In other words, the display apparatus 800 has a display surface that allows the electronic paper 600 held within the main body portion 801 to be visually recognized through the transparent glass plate 804.

A terminal portion 806 is formed in a leading edge portion (the left side in FIGS. 9A and 9B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display apparatus 800 set forth above, the electronic paper 600 is removably fitted to the main body portion 801 and is portable in a state that it is removed from the main body portion 801. Furthermore, the electronic paper 600 of the display apparatus 800 is formed from the electrophoretic display device 20 described above.

In this regard, it is to be noted that the electronic apparatus of the present invention is not limited to the uses as described above. Examples of other uses of the electronic apparatus include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The present electrophoretic display device 20 can be used in display parts of the various kinds of electronic apparatuses described above.

Although the electrophoretic display sheet, the electrophoretic display device and the electronic apparatus of the present invention have been described with reference to the illustrated embodiments, the present invention is not limited thereto. The configuration of each component may possibly be replaced by other arbitrary configurations having equivalent functions. It may also be possible to add other optional components to the present invention.

Furthermore, the electrophoretic display device of the present invention may be provided by combining two or more arbitrary configurations (features) employed in the respective embodiments described above. For example, the electrophoretic display device of the present invention may be combination of the configurations of the first and second embodiments.

Although a pair of mutually facing electrodes is employed in the electrophoretic display device of the foregoing embodiments, the present invention is not limited thereto and may be used in, e.g., an electrophoretic display device in which a pair of electrodes is formed on one and the same substrate.

Further, although a pair of mutually facing substrate is employed in the electrophoretic display device of the foregoing embodiments, the present invention is not limited thereto and may be used in, e.g., an electrophoretic display device having a single substrate.

Furthermore, although each of the microcapsules is arranged to extend over two neighboring pixel electrodes in the foregoing embodiments, the present invention is not limited thereto. As an alternative example, each of the microcapsules may be arranged to extend over three neighboring pixel electrodes or may be arranged not to extend over neighboring electrodes. It may also be possible to employ the combination of these arrangements.

EXAMPLES

Next, description will be made on specific experimental examples of the present invention.

1. Manufacture of Electrophoretic Display Device

Five electrophoretic display devices were manufactured in each of Examples and Comparative Examples.

Example 1

(A1) Production of Microcapsules (A1-1) Preparation of Electrophoretic Dispersion Liquid First, spherical white particles having an average particle size of 200 nm and spherical black particles having an average particle size of 60 nm were prepared. In this regard, it is to be noted that titanium oxide particles ("CR-90" which was a product of Ishihara Sangyo Kaisha, Ltd.) were used as the white particles, and carbon black particles were used as the black particles.

Next, an electrophoretic dispersion liquid was prepared by dispersing the white particles and the black particles in a liquid phase dispersion medium in a weight ratio of 6:1. In this regard, it is to be noted that Isopar M (a product of Exon Mobil Chemical Co.) was used as the liquid phase dispersion medium.

(A1-2) Formation of First Capsule Layer 5 g of melamine, 5 g of urea, 20 g of a 37 wt % formaldehyde aqueous solution and 1 g of a 25 wt % ammonia water were fed into a round-bottomed separable flask of 100 mL in capacity to obtain a mixture. The mixture was heated up to 70° C. while stirring the same.

The mixture became transparent in its entirety when reached about 65° C. in the heating process. After heated to 70° C., the mixture was kept at that temperature for one hour and then cooled up to 30° C., thus obtaining an initial condensation compound of the melamine, the urea and the formaldehyde.

Next, the electrophoretic dispersion liquid obtained in the step (A1-1) was dropped into the mixture containing the initial condensation compound and was stirred for two hours with a rotational speed of 800 rpm. Thereafter, the stirred mixture was heated up to 70° C. over one hour and aged for two hours at that temperature, after which the aged mixture was cooled up to normal temperature.

A first capsule layer composed of melamine-based resin was formed through the steps noted above, thus obtaining pre-microcapsules which encapsulated the electrophoretic dispersion liquid thereinto. After continuously stirring the mixture for one day and one night, pre-microcapsules having an average particle size of 42 μm were classified.

(A1-3) Formation of Second Capsule Layer 50 g of polycarboxylic acid ("Aqualic HL-415" which was a 45% polyacrylic acid having MW 10000 aqueous solution and a product of NIPPON SHOKUBAI CO., LTD.) and 50 g of water were fed into a separable flask of 300 mL in capacity to obtain a mixture.

A dispersion liquid that contains 20 g of an epoxy compound ("Denacol EX521" which was polyglycerol polyglycidyl ester and a product of Nagase ChemteX Corporation) dispersed in 50 g of water was dropped into the mixture over 10 minutes while stirring the same. A temperature of the mixture (a reaction liquid) was kept at 25° C. or more when dropping the dispersion liquid.

Next, the reaction liquid was stirred for 30 minutes, heated up to 40° C. and kept for one hour. Thereafter, the reaction liquid was cooled up to normal temperature, thus obtaining a material for forming a second capsule layer having a solid content concentration of 25%.

Next, 100 g of the pre-microcapsules obtained in the step (A1-2) was put into a flat-bottomed separable flask of 500 mL in capacity, and deionized water was added thereto so that a total amount thereof was adjusted to 200 g, to thereby obtain a capsule dispersion liquid.

Next, the capsule dispersion liquid was heated up to 50° C. while stirring the same and 180 g of the material for forming the second capsule layer obtained previously was added to the heated capsule dispersion liquid. After five minutes had lapsed, 1.0 g of a 2.5% sodium diethyl dithio-carbamate aqueous solution as a cross-linking agent was dropped into the capsule dispersion liquid over five minutes to obtain a mixture.

Then, the mixture (a reaction liquid) was allowed to react for five hours at 50° C. so that a second capsule layer composed of epoxy-based resin was formed on a surface of each of the pre-microcapsules (the first capsule layer).

Through the steps noted above, microcapsules were obtained in which the electrophoretic dispersion liquid was encapsulated into a capsule body formed of the first capsule layer and the second capsule layer. After continuously stirring the capsule dispersion liquid for one day and one night, microcapsules having an average particle size of 42 μm were classified.

(A2) Preparation of Microcapsule Dispersion Liquid

Next, the microcapsules obtained in the step (A1) were mixed with a binder in a weight ratio of 1:1 to thereby prepare a microcapsule dispersion liquid.

In this regard, it is to be noted that a mixture obtained by mixing dodecyl methacrylate (having a melting point of 25° C. or less) with 2-ethylhexyl methacrylate (having a melting point of 25° C. or less) in a weight ratio of 9:1 was used as the binder.

(A3) Formation of Microcapsule-Containing Layer

Next, a substrate having a second electrode made of ITO ("OTEC220B" which was a PET-ITO substrate and a product of Oike & Co., Ltd.) was prepared.

Then, the microcapsule dispersion liquid obtained in the step (A2) was applied on the second electrode (ITO) of the PET-ITO substrate by a doctor blade method to thereby form a microcapsule-containing layer having an average thickness of 45 μm.

(A4) Formation of Adhesive Agent Layer

Next, a sheet-like adhesive agent layer having an average thickness of 15 μm was prepared and arranged on the microcapsule-containing layer at normal temperature (25° C.).

In this regard, it is to be noted that a mixture obtained by mixing polyurethane with EQ-modified dicyclopentenyl methacrylate in a weight ratio of 19:1 was used in forming the adhesive agent layer.

(A5) Bonding of Circuit Board

Next, a circuit board having first electrodes each made of ITO was arranged on the adhesive agent layer at normal temperature (25° C.). Thereafter, the circuit board and the adhesive agent layer were bonded together by a roll laminator whose inter-roll pressure was set equal to 0.5 MPa, to thereby obtain a bonded body.

(A6) Sealing Step

Next, an edge (an outer circumferential portion) of the bonded body obtained in the step (A5) was sealed off with an epoxy-based adhesive agent, to thereby obtain an electrophoretic display device as shown in FIG. 1.

Example 2

An electrophoretic display device was obtained in the same manner as in the Example 1, except that the pre-microcapsules (which had the electrophoretic dispersion liquid encapsulated into the first capsule layer made of the melamine-based resin) produced through the steps (A1-1) and (A1-2) but not though the step (A1-3) of the Example 1 were used as microcapsules in this Example 2.

Example 3

An electrophoretic display device was obtained in the same manner as in the Example 1, except that microcapsules are produced through the below-noted step (A1') instead of the step (A1) of the Example 1 described above.

(A1') 100 g of the electrophoretic dispersion liquid obtained in the same manner as in the step (A1-1) of the Example 1 was put into a flat-bottomed separable flask of 500 mL in capacity, and deionized water was added thereto so that a total amount thereof was adjusted to 200 g, to obtain a mixture. Thereafter, the mixture was stirred to thereby obtain a core material dispersion liquid.

Next, the core material dispersion liquid was heated up to 50° C. while stirring the same and 180 g of the material for forming the second capsule layer obtained in the same manner as in the step (A1-3) of the Example 1 was added to the core material dispersion liquid.

After five minutes, 1.0 g of a 2.5% sodium diethyl dithiocarbamate aqueous solution as a cross-linking agent was dropped into the core material dispersion liquid over five minutes to obtain a mixture.

Then, the mixture (a reaction liquid) was allowed to react for five hours at 50° C., to thereby obtain microcapsules in which the electrophoretic dispersion liquid was encapsulated into a capsule body made of epoxy-based resin.

Example 4

An electrophoretic display device was obtained in the same manner as in the Example 1, except that a microcapsule dispersion liquid containing the microcapsules and sub-microcapsules was used. Production of the sub-microcapsules and preparation of the microcapsule dispersion liquid were performed in the following manner.

(B1) Production of Sub-Microcapsules

First, 24 parts of gum arabic (a product of Wako Pure Chemical Industries, Ltd.) and 8 parts of gelatin (a product of Wako Pure Chemical Industries, Ltd.) were dissolved in 180 parts of water to obtain a solution, and a temperature of this solution was controlled to become 43° C.

Then, 316 parts of the electrophoretic dispersion liquid prepared in the step (A1-1) and controlled to have the same temperature as mentioned just above was added to the solution while stirring the latter, to thereby obtain a suspension liquid.

799 parts of hot water and 48 parts of an urethane emulsion ("Superflex 700" which was a product of Daiichi Pharmaceutical Co., Ltd.) were added to the suspension liquid thus obtained.

Next, 20 parts of a 10 wt % acetic acid aqueous solution was added to the suspension liquid. Thereafter, the suspension liquid was cooled up to 10° C. to coacervate it. After cooling, 10 parts of a 37 wt % formalin aqueous solution and 45 parts of a 10 wt % sodium carbonate aqueous solution were added to the suspension liquid. The suspension liquid was heated up to room temperature and aged for ninety minutes.

After aging, an aziridine compound ("Chemitide PZ-33" which was a product of NIPPON SHOKUBAI CO., LTD.) was added to the suspension liquid. Then, the suspension liquid was heated up to 50° C. and aged for sixty minutes, to thereby obtain the sub-microcapsules.

After continuously stirring the suspension liquid for one day and one night, sub-microcapsules having an average particle size of 12 μm were classified.

(B2) Preparation of Microcapsule Dispersion Liquid

Next, a microcapsule dispersion liquid was prepared by mixing the microcapsules obtained in the step (A1) of the Example 1, the sub-microcapsules obtained in the step (B1) and the same binder as used in the step (A2) of the Example 1, in a weight ratio of 7:1:8.

Comparative Example 1

An electrophoretic display device was obtained in the same manner as in the Example 1, except that microcapsules are produced through the following step (A1") instead of the step (A1) described above.

(A1") First, 24 parts of gum arabic (a product of Wako Pure Chemical Industries, Ltd.) and 8 parts of gelatin (a product of Wako Pure Chemical Industries, Ltd.) were dissolved in 180 parts of water contained in a separable flask of 300 mL in capacity to obtain a solution, and a temperature of this solution was controlled to become 43° C.

Then, 316 parts of the electrophoretic dispersion liquid prepared in the step (A1-1) of the Example 1 and controlled to have the same temperature as mentioned just above was added to the solution while stirring the latter at 1,000 rpm, to thereby obtain a suspension liquid.

799 parts of hot water and 48 parts of an urethane emulsion ("Superflex 700" which was a product of Daiichi Pharmaceutical Co., Ltd.) were added to the suspension liquid thus obtained.

Next, 20 parts of a 10 wt % acetic acid aqueous solution was added to the suspension liquid. Thereafter, the suspension liquid was cooled up to 10° C. to coacervate it. After cooling, 10 parts of a 37 wt % formalin aqueous solution and 45 parts of a 10 wt % sodium carbonate aqueous solution were added to the suspension liquid. The suspension liquid was heated up to room temperature and aged for ninety minutes.

After aging, an aziridine compound ("Chemitide PZ-33" which was a product of NIPPON SHOKUBAI CO., LTD.) was added to the suspension liquid. Then, the suspension liquid was heated up to 50° C. and aged for sixty minutes, to thereby obtain microcapsules in which the electrophoretic dispersion liquid is encapsulated into a capsule body made of a composite material of the gum arabic and the gelatin.

After continuously stirring the suspension liquid for one day and one night, microcapsules having an average particle size of 54 μm were classified.

Comparative Example 2

An electrophoretic display device was obtained in the same manner as in the Comparative Example 1, except that the rotational speed in stirring the electrophoretic dispersion liquid is changed to 600 rpm and microcapsules having an average particle size of 75 μm were classified.

2. Evaluation

Five electrophoretic display devices manufactured in each of the Examples and the Comparative Examples were subjected to evaluation of the spherical particle ratio, the pressure resistance (laminate pressure resistance test), the bleed resistance and the display contrast.

Furthermore, evaluation of the pressure resistance (hard ball drop test) was performed using products in which the microcapsule-containing layer is formed on the PET-ITO substrate prior to carrying out the step (A4) in each of the Examples and the Comparative Examples.

(1) Spherical Particle Ratio

The spherical particle ratios of the electrophoretic display devices obtained in each of the Examples and the Comparative Examples were found using the method described earlier in respect of the first embodiment.

(2) Pressure Resistance

The pressure resistance of the electrophoretic display devices obtained in each of the Examples and the Comparative Examples were evaluated by conducting a laminate pressure resistance test and a hard ball drop test.

(2-A) Laminate Pressure Resistance Test

With respect to the electrophoretic display devices manufactured in each of the Examples and the Comparative Examples, the number of microcapsules survived without being crushed was measured using a microscope (of 100 or 300 magnification). Then, evaluation was conducted according to the following four criteria.

A: the number of microcapsules survived without being crushed was 80% or more of the total number of microcapsules.

B: the number of microcapsules survived without being crushed was equal to or more than 70% but less than 80% of the total number of microcapsules.

C: the number of microcapsules survived without being crushed was equal to or more than 50% but less than 70% of the total number of microcapsules.

D: the number of microcapsules survived without being crushed is less than 50% of the total number of microcapsules.

(2-B) Hard Ball Prop Test

The products in which the microcapsule-containing layer was formed on the PET-ITO substrate prior to carrying out the step (A4) in each of the Examples and the Comparative Examples were placed on a level block (made of hard rubber with a thickness of about 3 mm) so that the microcapsule-containing layer lied on an upper side. Then, a hard ball (having a diameter of about 10 mm and a weight of about 5 g) was dropped from a height of 10 cm.

Thereafter, the number of microcapsules survived without being crushed was measured using a microscope (of 100 or 300 magnification). Then, evaluation was conducted according to the following four criteria.

A: the number of microcapsules survived without being crushed was 80% or more of the total number of microcapsules.

B: the number of microcapsules survived without being crushed was equal to or more than 70% but less than 80% of the total number of microcapsules.

C: the number of microcapsules survived without being crushed was equal to or more than 50% but less than 70% of the total number of microcapsules.

D: the number of microcapsules survived without being crushed was less than 50% of the total number of microcapsules.

(3) Bleed Resistance Test Through Heating

The electrophoretic display devices manufactured in each of the Examples and the Comparative Examples were left in an atmosphere of 70° C. for 100 hours.

Thereafter, the number of microcapsules that did not suffer from dissipation of the electrophoretic dispersion liquid and crushing was measured. Then, evaluation was conducted according to the following four criteria.

A: the number of microcapsules that did not suffer from dissipation of the electrophoretic dispersion liquid was 80% or more of the total number of microcapsules.

B: the number of microcapsules that did not suffer from dissipation of the electrophoretic dispersion liquid was equal to or more than 70% but less than 80% of the total number of microcapsules.

C: the number of microcapsules that did not suffer from dissipation of the electrophoretic dispersion liquid was equal to or more than 50% but less than 70% of the total number of microcapsules.

D: the number of microcapsules that did not suffer from dissipation of the electrophoretic dispersion liquid was less than 50% of the total number of microcapsules.

(4) Display Contrast

A white and black reflectance at the time when a direct current voltage of 20 V is applied for 0.4 second to between the electrodes of the electrophoretic display devices manufactured in each of the Examples and the Comparative Examples was measured using a spectrophotometer ("SpectroEye" which was a product of Gretag Macbeth Ltd.).

Then, a contrast was found by the following equation (3). In this regard, it is to be noted that the white and black reflectance was measured by switching poles of the voltage applied and was measured for one whole surface of each of the electrophoretic display devices.

$$\text{contrast} = (\text{white reflectance})/(\text{black reflectance}) \quad (3)$$

The results of evaluation are shown in Table 1.

TABLE 1

|  | Construction and material of capsule body | Spherical particle ratio (%) | Pressure resistance | | Bleed resistance test | Display contrast |
|---|---|---|---|---|---|---|
|  |  |  | Laminate pressure resistance test | Hard ball drop test |  |  |
| Ex. 1 | Two-layer construction First capsule layer: melamine-based resin Second capsule layer: epoxy-based resin | 92.5 | A | A | A | 7.8 |
| Ex. 2 | Single-layer construction melamine-based resin | 91.3 | B | C-B | A | 6.2 |
| Ex. 3 | Single-layer construction epoxy-based resin | 80.1 | B | C-B | B | 5.5 |
| Ex. 4 | Two-layer construction First capsule layer: melamine-based resin Second capsule layer: epoxy-based resin | 89.7 | A | A | A | 8.4 |
| Comp. Ex. 1 | Single-layer construction composite material of gum arabic and gelatin | 53.1 | D | D | D | 6.2 |
| Comp. Ex. 2 | Single-layer construction composite material of gum arabic and gelatin | 19.3 | D | D | D | 2.7 |

As shown in Table 1, all of the electrophoretic display devices of the respective Examples exhibited high spherical particle ratios and were superior in the pressure resistance, the bleed resistance and the display contrast.

In particular, the electrophoretic display devices (of the Examples 1 and 4) whose capsule body had the first capsule layer made of the melamine-based resin and the second capsule layer made of the epoxy-based resin were quite superior in the pressure resistance and the bleed resistance.

Moreover, the electrophoretic display devices of the Example 4 whose microcapsule-containing layer contains the sub-microcapsules were capable of performing uniform display, because the sub-microcapsules filled gaps between the microcapsules. As a result, it was possible to increase the reflectance of the white particles and to assure high display contrast.

In contrast, the electrophoretic display devices of the respective Comparative Examples exhibited low spherical particle ratios and were inferior in the pressure resistance and the bleed resistance, as compared to the electrophoretic display devices of the respective Examples.

What is claimed is:

1. An electrophoretic display sheet comprising:
a base substrate having one major surface; and
a microcapsule-containing layer provided on the side of the one major surface of the base substrate and having one major surface, the microcapsule-containing layer including a plurality of microcapsules, each of the microcapsules having a shell and an electrophoretic dispersion liquid containing at least one kind of electrophoretic particles and encapsulated into the shell,
wherein the microcapsules exist in a generally spherical shape within the microcapsule-containing layer, and
wherein in the case where in a plan view of the microcapsule-containing layer as seen from the side of the one major surface thereof, the number of microcapsules having a Heywood circularity factor of 1.40 or less is defined as $N_{1.40}$ and the number of microcapsules having the Heywood circularity factor of 1.08 or less is defined as $N_{1.08}$, a spherical particle ratio calculated by the following equation, that is, spherical particle ratio (%)= $(N_{1.08}/N_{1.40}) \times 100$, is equal to or greater than 60%.

2. The electrophoretic display sheet as claimed in claim 1, wherein in a cross section taken along a direction orthogonal to the one major surface of the microcapsule-containing layer, the Heywood circularity factor of the microcapsules is in the range of 1.00 to 1.10.

3. The electrophoretic display sheet as claimed in claim 1, wherein the shell of each of the microcapsules includes a spherical first layer and a spherical second layer arranged outside the first layer.

4. The electrophoretic display sheet as claimed in claim 3, wherein the second layer has higher elasticity than that of the first layer.

5. The electrophoretic display sheet as claimed in claim 4, wherein a constituent material of the first layer contains melamine-based resin as a major component thereof.

6. The electrophoretic display sheet as claimed in claim 5, wherein a constituent material of the second layer contains epoxy-based resin as a major component thereof.

7. The electrophoretic display sheet as claimed in claim 3, wherein the first layer and the second layer are chemically bonded together in their interfacial surfaces.

8. The electrophoretic display sheet as claimed in claim 1, wherein the microcapsules are formed so as to have the same size.

9. The electrophoretic display sheet as claimed in claim 1, wherein the at least one kind of the electrophoretic particles included in the microcapsules contain white particles and colored particles differing in color tone from the white particles.

10. The electrophoretic display sheet as claimed in claim 1, wherein the microcapsule-containing layer further includes a plurality of sub-microcapsules, each of the sub-microcapsules having a shell and an electrophoretic dispersion liquid containing at least one kind of electrophoretic particles and encapsulated into the shell, the sub-microcapsules having higher flexibility and smaller size than those of the microcapsules, and
wherein each of the microcapsules has a size corresponding to a full thickness of the microcapsule-containing layer, the microcapsules are arranged so as to form a single layer, and the sub-microcapsules are arranged so as to fill gaps formed between the microcapsules within the microcapsule-containing layer.

11. The electrophoretic display sheet as claimed in claim 10, wherein the at least one kind of the electrophoretic particles included in the sub-microcapsules contain white particles and colored particles differing in color tone from the white particles.

12. An electrophoretic display device comprising:
a base substrate having one major surface;
a microcapsule-containing layer provided on the side of the one major surface of the base substrate, the microcapsule-containing layer including a plurality of microcapsules, each of the microcapsules having a shell and an electrophoretic dispersion liquid containing at least one kind of electrophoretic particles and encapsulated into the shell; and
an opposite substrate provided on the opposite side of the microcapsule-containing layer from the base substrate, wherein the microcapsules exist in a generally spherical shape within the microcapsule-containing layer, and
wherein in the case where in a plan view of the microcapsule-containing layer as seen from the side of the one major surface thereof, the number of microcapsules having a Heywood circularity factor of 1.40 or less is defined as $N_{1.40}$ and the number of microcapsules having the Heywood circularity factor of 1.08 or less is defined as $N_{1.08}$, a spherical particle ratio calculated by the following equation, that is, spherical particle ratio (%)= $(N_{1.08}/N_{1.40}) \times 100$, is equal to or greater than 60 %.

13. The electrophoretic display device as claimed in claim 12, further comprising an adhesive agent layer that bonds the microcapsule-containing layer and the opposite substrate together.

14. An electronic apparatus provided with the electrophoretic display device as claimed in claim 12.

* * * * *